United States Patent
Lathia et al.

(10) Patent No.: US 10,613,536 B1
(45) Date of Patent: Apr. 7, 2020

(54) DISTRIBUTED AUTOMATED MOBILE VEHICLE ROUTING

(71) Applicant: Amazon Technologies, Inc., Seattle, WA (US)

(72) Inventors: Bhavnish H. Lathia, Redmond, WA (US); Varadarajan Gopalakrishnan, Cupertino, CA (US); Jesper Mikael Johansson, Redmond, WA (US); James Domit Mackraz, Palo Alto, CA (US); Brandon William Porter, Yarrow Point, WA (US); Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1184 days.

(21) Appl. No.: 14/308,557

(22) Filed: Jun. 18, 2014

(51) Int. Cl.
*G06Q 10/08* (2012.01)
*G05D 1/02* (2020.01)

(52) U.S. Cl.
CPC ........... *G05D 1/021* (2013.01); *G05D 1/0202* (2013.01); *G05D 1/0206* (2013.01); *G06Q 10/08355* (2013.01)

(58) Field of Classification Search
CPC ............. G06Q 10/08355; G05D 1/021; G05D 1/0202; G05D 1/0206
See application file for complete search history.

(56) References Cited

U.S. PATENT DOCUMENTS

| | | | | |
|---|---|---|---|---|
| 2014/0032034 A1* | 1/2014 | Raptopoulos | ........ | G08G 5/0069 701/25 |
| 2014/0046512 A1* | 2/2014 | Vallimar | ............. | G05D 1/0212 701/19 |
| 2014/0254896 A1* | 9/2014 | Zhou | ...................... | B25J 9/0006 382/124 |
| 2014/0303814 A1* | 10/2014 | Burema | ............... | A01B 79/005 701/3 |
| 2015/0285645 A1* | 10/2015 | Maise | ................ | B62D 15/0285 701/25 |
| 2015/0302858 A1* | 10/2015 | Hearing | .................. | G10L 19/00 381/58 |

OTHER PUBLICATIONS

Brian Coltin et al., Online Pickup and Delivery Planning with Transfers for Mobile Robots, Presented on May 31-Jun. 7, 2014, 2014 IEEE International Conference on Robotics & Automation (ICRA), Hong Kong Convention and Exhibition Center, pp. 5786-5791 (Year: 2014).*

* cited by examiner

*Primary Examiner* — Rupangini Singh
(74) *Attorney, Agent, or Firm* — Athorus, PLLC

(57) ABSTRACT

This disclosure describes a distributed automated mobile vehicle ("automated mobile vehicle") system for autonomously delivering orders of items to various delivery locations and/or autonomously returning items to a return location. In some implementations, each user may own or be assigned their own automated mobile vehicle that is associated with the user and an automated mobile vehicle control system maintained by the user. When the user orders an item, the user owned or controlled automated mobile vehicle navigates to a materials handling facility, retrieves the ordered item and delivers it to the user.

18 Claims, 12 Drawing Sheets

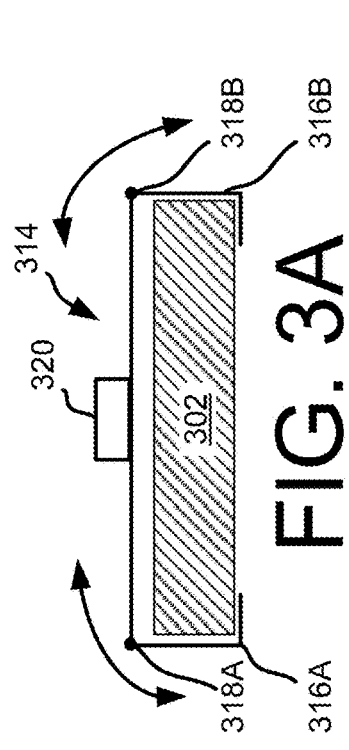
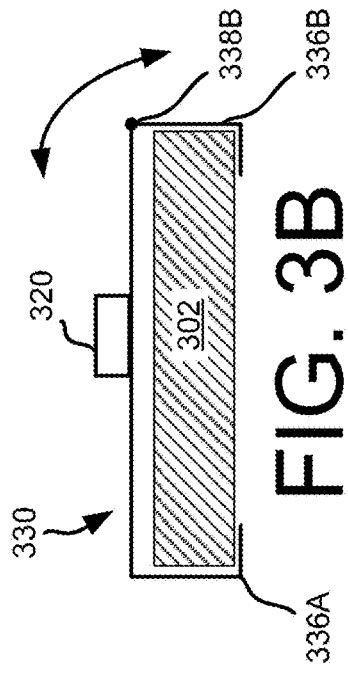
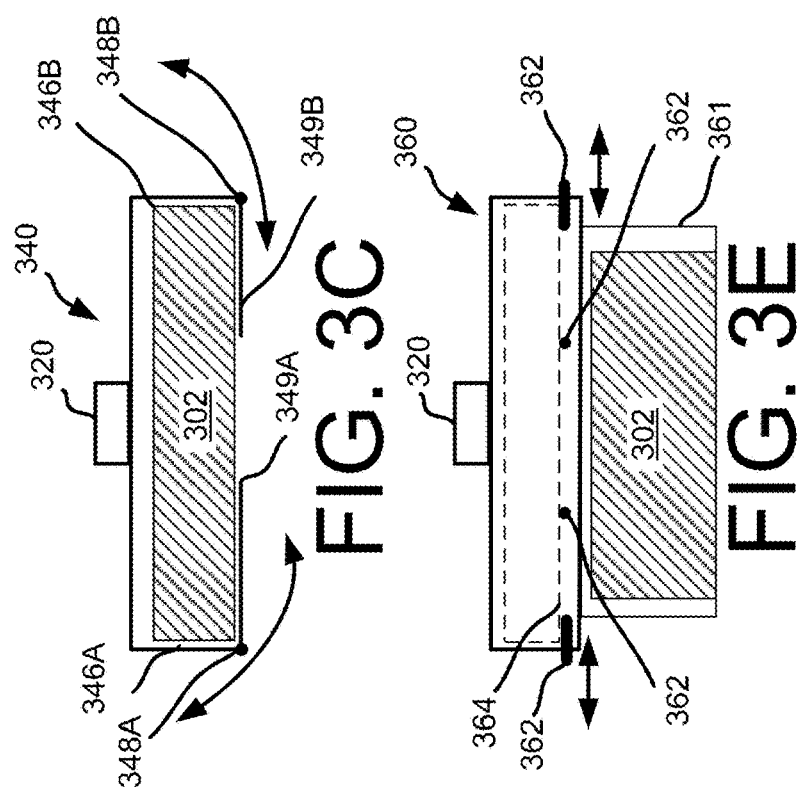
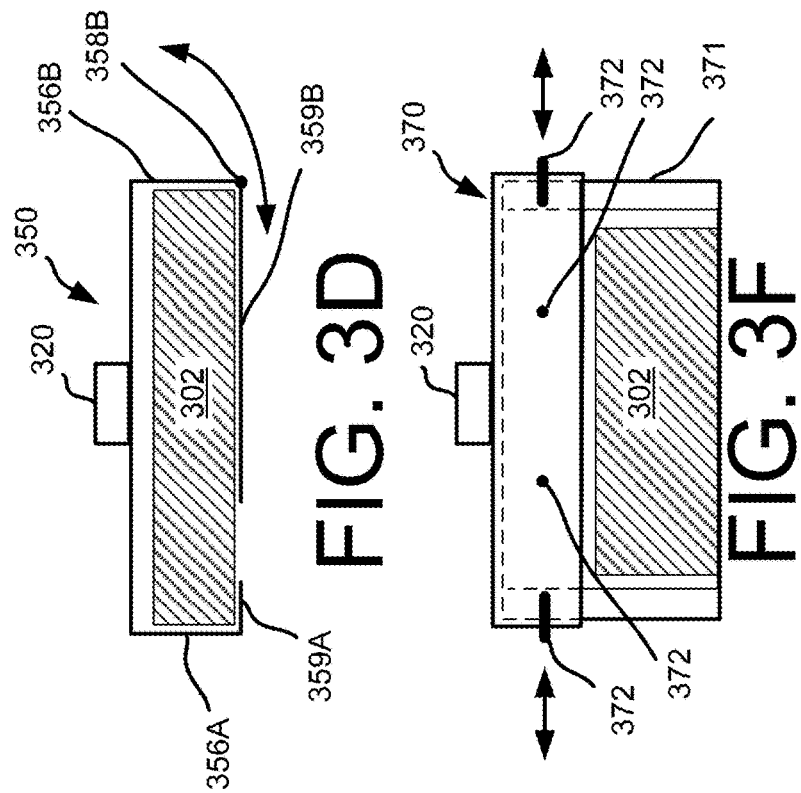

DISTRIBUTED AUTOMATED MOBILE VEHICLE ROUTING

BACKGROUND

Physical delivery of items to user specified locations has improved dramatically over the years, with some retailers offering next day delivery of ordered items. The final, or last mile delivery of physical items to a user specified location, is traditionally accomplished using a human controlled truck, bicycle, or cart. For example, a user may order an item for delivery to their home. The item may be picked from a materials handling facility, packed and shipped to the customer for final delivery by a shipping carrier, such as the United States Postal Service, FedEx, or UPS. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, or store the item in a post office box.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 3A-3G depict block diagrams of various inventory engagement mechanisms for engaging and disengaging inventory handled by the automated aerial delivery vehicle illustrated in FIG. 2, according to an implementation.

Figure 1:
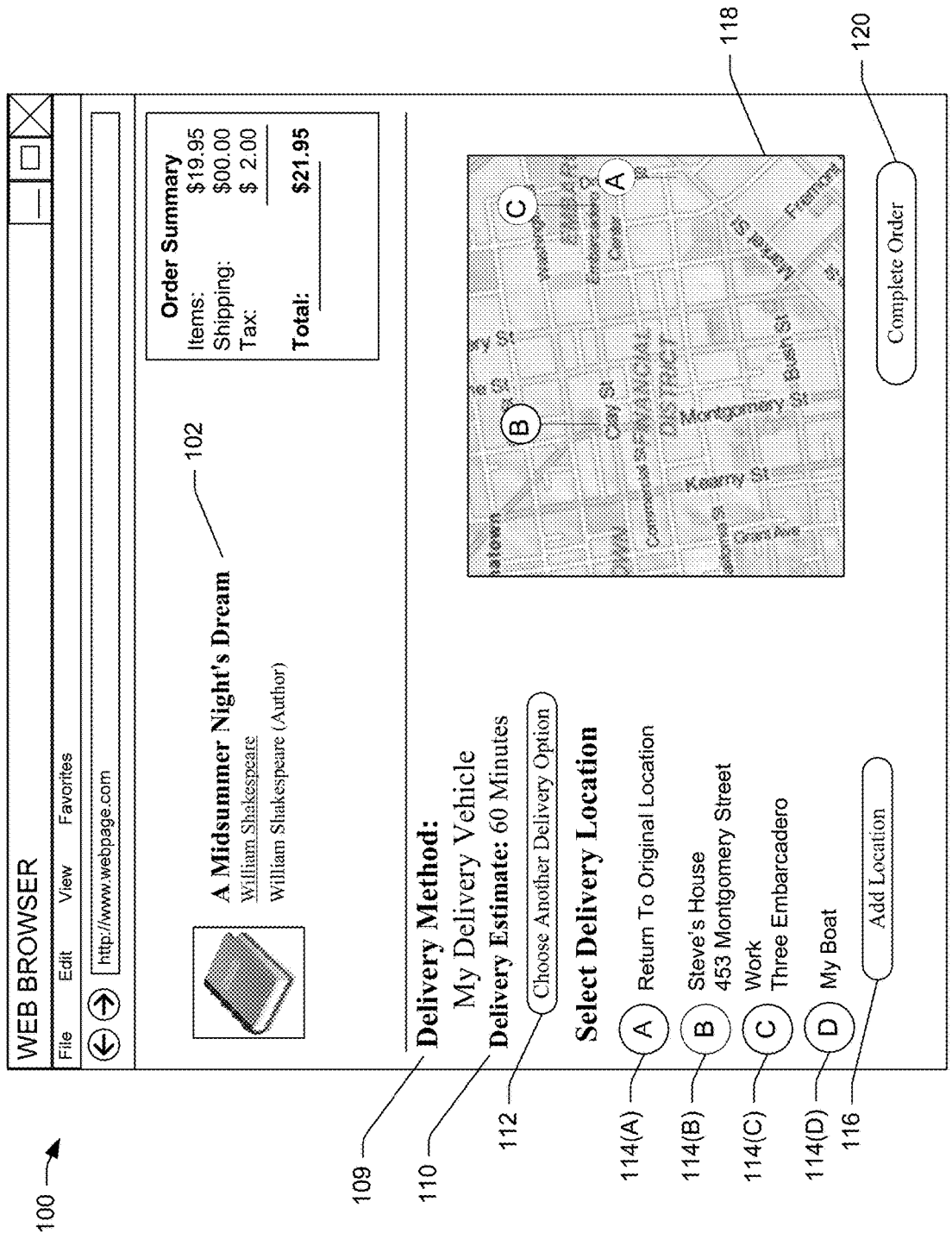
FIG. 1 depicts a graphical user interface for selecting a delivery option for the delivery of an item, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a distributed automated mobile vehicle ("AMV") system for autonomously delivering orders of items to various delivery locations and/or autonomously returning items to a return location. As discussed in further detail below, in some implementations, each user may own or be assigned their own AMV that is associated with the user and an AMV management system. When not in use, the AMV may be stationed at a user designated location (e.g., their home, a staging area, or rooftop).

When the user places an order for an item and selects AMV delivery, the AMV management system may notify the AMV associated with the user that an order for one or more items is available for retrieval and delivery to the user, and provide routing instructions to the AMV. Upon receiving the routing instructions, the AMV may complete a pre-flight safety check and then, based on the routing instructions and/or additional information, develop a navigation path to navigate from the AMV's current location to a materials handling facility that contains the item(s) to be retrieved and delivered to the user. When the AMV reaches the materials handling facility, the item(s) is secured to the AMV and the AMY navigates back to a user designated location with the item, thereby completing delivery of the item to the user. In some implementations, the AMV's power supply may be recharged and/or other maintenance performed prior to the AMV navigating away from the materials handling facility.

In a similar manner, a user may initiate a return of an item. In one implementation, a user may communicate with the AMV management system to initiate a return of one or more items. The AMV management system may then provide routing instructions to the AMV relating to the item to be returned. The user may then secure the item to the AMV and provide notification (e.g., to the AMV and/or the AMV management system) that the item is secured to the AMY and ready for return. The AMV may then complete a pre-flight safety check and navigate to a materials handling facility to complete the return of the item.

In some implementations, AMVs utilized in the described system may all conform to one or more minimum requirements (e.g., size, communication abilities, item attachment specifications, payload capacity, and flight duration). If the AMV is issued to the user by an entity associated with the AMV management system and/or another authorized entity, the AMV may be known to satisfy the minimum requirements and already be associated with the AMY management system. If the AMV originates with the user or another entity, verification may be performed to ensure that the AMV satisfies the minimum requirements before it is associated with the AMV management system.

In some implementations, the minimum requirements may specify that each AMV must be able to communicate with other AMVs in the area and/or the AMV management system to provide and/or receive information, such as AMV identification, current position, altitude, avoidance information, or velocity. For example, AMVs may be configured to support automatic dependent surveillance-broadcast (ADS-B) and both receive and/or transmit identification, current position, altitude, and velocity information. This information may be stored in a central location by the AMY management system and/or dynamically shared between nearby AMVs, materials handling facilities, relay locations, or the AMV management system. For example, other AMVs may provide ADS-B information and/or additional information regarding weather (e.g., wind, snow, or rain), landing conditions, traffic, or objects that may obstruct a flight path. The receiving AMVs may utilize this information to plan the route/flight path and/or to modify the actual navigation of the route. Likewise, the AMV management system may utilize this information while controlling and/or staging of AMVs located near a materials handling facility.

While the examples discussed herein primarily focus on AMVs in the form of an aerial vehicle utilizing multiple propellers to achieve flight (e.g., a quad-copter or octo-copter), it will be appreciated that the implementations discussed herein may be used with other forms of AMVs, such as semi or fully automated ground based vehicles and/or semi or fully automated water based vehicles. Likewise, the AMVs described herein may be unmanned in that there is no human pilot aboard and it is navigated autonomously by onboard computing systems, remote computing systems and/or by remote control of a user. The AMVs may also be non-military in that they are for civilian use and are designed to transport commercial and/or private payloads. While AMVs may vary in size and complexity, the AMVs may generally weigh less than 50 lbs. and be limited or otherwise restricted as to flight duration or altitude navigation.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A delivery location, as used herein, refers to any location at which one or more inventory items may be delivered. For example, the delivery location may be a person's residence, a place of business, a location within a materials handling facility (e.g., packing station or inventory storage), or any location where a user or inventory is located. Inventory or items may be any physical goods that can be transported using an AMV.

A "relay location" as used herein may include, but is not limited to, a delivery location, a materials handling facility, a cellular tower, a rooftop of a building, a delivery location, the top of a tower (e.g., cell phone tower or electrical pole), or any other location where an AMV can land, charge, retrieve inventory, replace batteries, and/or receive service.

FIG. 1 depicts a graphical user interface 100 for selecting a delivery option for the delivery of an item, according to an implementation. In this example, the user, using a device, has requested to purchase a book entitled "A Midsummer Night's Dream" 102. As part of the purchase process, the user may select one or more delivery methods that may be used to deliver the selected item. In this example, the user has selected "My Delivery Vehicle" 109 with a delivery time estimate 110 of 60 minutes. If the user does not desire to receive the item using the AMV associated with the user, the user may choose another delivery option by selecting the "Choose Another Delivery Option" 112 button. For example, the user may select to have the ordered item(s) delivered using traditional ground based carriers. In some implementations, the user may be associated with other AMV delivery options that may be selected. For example, the materials handling facility that contains the ordered item may have AMVs that can be selected for use in delivering the item(s). In still other implementations, the user may be associated with another user's AMV and may select that AMV for use in delivering the item. For example, a group of users may collectively own or control one or more AMVs and any of those users may be able to select one of those AMVs for use in delivery of an ordered item. In another example, a user may allow another use to utilize their AMY for order delivery.

In still other examples, the AMV may be associated with the device used to order the item, the account through which the item was ordered, a payment instrument used to pay for the item, or any combination thereof. For example, a business may own or control and AMV and an employee or customer of the business may place an order for an item that is to be delivered using the AMV associated with the business. In one example, the AMV may be associated with a device that is controlled by the business and when an order for an item is placed using the device, the AMV associated with the device is provided as a delivery option to the user placing the order.

Returning to FIG. 1, the user may also select a delivery time for the automated delivery. For example, if the user does not desire to receive the item, in this example, in 60 minutes, they may select another time at which they would like to receive the item. For example, if the user wants the item to be delivered using their AMV so that it will arrive at 5:15 pm in the evening when they are returning from work, they can select that time as the desired delivery time.

In addition to selecting a delivery method and/or a delivery time, the user may choose a delivery location 114. With the implementations described herein, when utilizing the AMV associated with the user, the user has the option to choose "Return to Original Location" 114(A). With this option, the starting or source location of the AMV, referred to herein as a user designated location, is known and/or determined (e.g., using global positioning systems ("GPS")) when the AMV departs. When returning with the ordered item, the AMV will return to the user designated location. This option may be beneficial because the user designated location is known to be a safe and/or dedicated landing area for the AMV because it departed from that location.

If the user does not desire to have the item delivered to the original location of the AMV, another location may be selected from either the list of locations 114 or the user may select a location on the presented map 118. The list of locations 114 may include other locations for which the user has received items via delivery from an AMV, or other locations near the user that can receive AMV deliveries.

For example, the user may have previously had an item delivered using an AMV to their friend Steve's home, as illustrated by the "Steve's House" delivery location option 114(B). Likewise, there may be a delivery location near the person's place of employment, as illustrated by the work delivery location option 114(C). Alternatively, the user may have identified another location for which location information can be determined and used for item delivery. In this example, the user has provided information that can be used to determine the current location of the user's boat 114(D). The location of the user's boat may be determined based on the GPS location of the boat and retrieving GPS data from the boat. In still other examples, the user can add other locations through selection of the "Add Location" button 116 or selecting a location on the map 118.

Upon user selection of a delivery location, the estimated delivery time may be dynamically updated to reflect the estimated amount of time needed for the AMV to depart the starting location, navigate to the materials handling facility that contains the ordered item, retrieve the item, and navigate to the selected destination location. The estimated delivery time may also include time for other events. For example, additional time may be included to recharge or replace the power module of the AMV, or pick the item from inventory within the materials handling facility. Upon selecting the "Complete Order" control 120, the AMV management system may process the user's order for delivery to the selected delivery location.

While the above example describes the use of an e-commerce website to order an item for delivery using an AMV owned or controlled by a user, in other implementations, items may be ordered or selected for AMV delivery using other mechanisms. For example, a user may pre-establish that ordered items are to be delivered using the implementations described herein. Rather than, or in addition to ordering an item through an e-commerce website, the user may utilize their mobile device, or another device, to order the item. For example, the user may capture an image of an item they wish to order or scan a barcode of an item to be ordered. The image and/or barcode may be processed and the determined item automatically ordered and scheduled for delivery using the techniques described herein.

Figure 2:
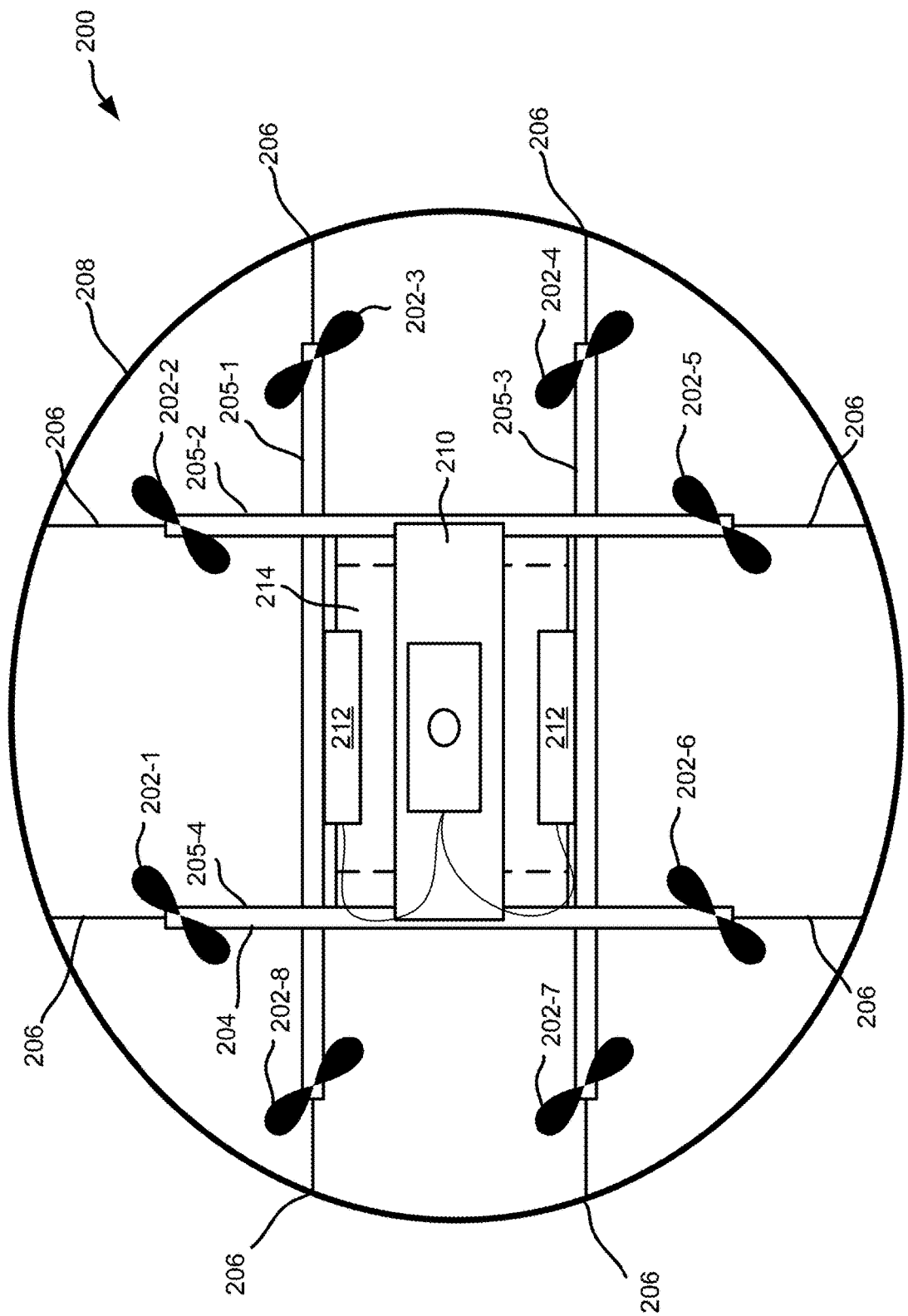
FIG. 2 depicts a block diagram of a top-down view of an automated aerial delivery vehicle, according to an implementation.

FIG. 2 illustrates a block diagram of a top-down view of an AMV 200, according to an implementation. In some implementations, the configuration illustrated in FIG. 2 may represent the minimum requirements needed for use of the AMV with the AMV management system and the implementations described herein. In other implementations, additional or fewer configurations and/or components may be required. Likewise, the various inventory engagement mechanisms illustrated in FIGS. 3A-3G may be representative of various inventory engagement mechanisms, any of which may satisfy the minimum requirements for the AMV. As with the AMV configuration, in other implementations the minimum requirements for the inventory engagement mechanism may be different than those discussed with respect to FIGS. 3A 3G.

Returning to FIG. 2, the AMV 200 includes eight propellers 202-1, 202-2, 202-3, 202-4, 202-5, 202-6, 202-7, 202-8 spaced about the frame 204 of the AMV. The propellers 202 may be any form of propeller (e.g., graphite, carbon fiber) and of a size sufficient to lift the AMY 200 and any inventory engaged by the AMV 200 so that the AMV 200 can navigate through the air to deliver the item(s) to a delivery location. While this example includes eight propellers, in other implementations, more or fewer propellers may be utilized. Likewise, in some implementations, the propellers may be positioned at different locations on the AMV 200. In addition, alternative methods of propulsion may be utilized. For example, fans, jets, turbojets, turbo fans, jet engines, and the like may be used to propel the AMV.

The frame 204 of the AMV 200 may likewise be of any suitable material, such as graphite, carbon fiber and/or aluminum. In this example, the frame 204 of the AMV 200 includes four rigid members 205-1, 205-2, 205-3, 205-4, or beams arranged in a hash pattern with the rigid members intersecting and joined at approximately perpendicular angles. In this example, rigid members 205-1 and 205-3 are arranged parallel to one another and are approximately the same length. Rigid members 205-2 and 205-4 are arranged parallel to one another, yet perpendicular to rigid members 205-1 and 205-3. Rigid members 205-2 and 205-4 are approximately the same length. In some embodiments, all of the rigid members 205 may be of approximately the same length, while in other implementations, some or all of the rigid members may be of different lengths. Likewise, the spacing between the two sets of rigid members may be approximately the same or different.

While the implementation illustrated in FIG. 2 includes four rigid members 205 that are joined to form the frame 204, in other implementations, there may be fewer or more components to the frame 204. For example, rather than four rigid members, in other implementations, the frame 204 of the AMV 200 may be configured to include six rigid members. In such an example, two of the rigid members 205-2, 205-4 may be positioned parallel to one another. Rigid members 205-1, 205-3 and two additional rigid members on either side of rigid members 205-1, 205-3 may all be positioned parallel to one another and perpendicular to rigid members 205-2, 205-4. With additional rigid members, additional cavities with rigid members on all four sides may be formed by the frame 204. As discussed further below, a cavity within the frame 204 may be configured to include an inventory engagement mechanism for the engagement, transport and delivery of item(s) and/or containers that contain item(s).

In some implementations, the AMV may be configured for aerodynamics. For example, an aerodynamic housing may be included on the AMV that encloses the AMV management system 210, one or more of the rigid members 205, the frame 204 and/or other components of the AMY 200. The housing may be made of any suitable material(s) such as graphite, carbon fiber, or aluminum. Likewise, in some implementations, the location and/or the shape of the inventory (e.g., item or container) may be aerodynamically designed. For example, in some implementations, the inventory engagement mechanism may be configured such that when the inventory is engaged it is enclosed within the frame and/or housing of the AMV 200 so that no additional drag is created during transport of the inventory by the AMY 200. In other implementations, the inventory may be shaped to reduce drag and provide a more aerodynamic design of the AMV and the inventory. For example, if the inventory is a container and a portion of the container extends below the AMV when engaged, the exposed portion of the container may have a curved shape.

The propellers 202 and corresponding propeller motors are positioned at both ends of each rigid member 205. The propeller motors may be any form of motor capable of generating enough speed with the propellers to lift the AMV 200 and any engaged inventory thereby enabling aerial transport of the inventory. For example, the propeller motors may each be a FX-4006-13 740 kv multi rotor motor.

Extending outward from each rigid member is a support arm 206 that is connected to a safety barrier 208. In this example, the safety barrier is positioned around and attached to the AMV 200 in such a manner that the motors and propellers 202 are within the perimeter of the safety barrier 208. The safety barrier may be plastic, or rubber. Likewise, depending on the length of the support arms 206 and/or the length, number or positioning of the rigid members 205, the safety barrier may be round, oval, or any other shape.

Mounted to the frame 204 is the AMY management system 210. In this example, the AMV management system 210 is mounted in the middle and on top of the frame 204. The AMV management system 210, as discussed in further detail below with respect to FIG. 10, controls the operation, routing, navigation, communication and the inventory engagement mechanism of the AMV 200.

Likewise, the AMV 200 includes one or more power modules 212. In this example, the AMV 200 includes two power modules 212 that are removably mounted to the frame 204. The power module for the AMV may be in the form of battery power, solar power, gas power, super capacitor, fuel cell, alternative power generation source, or a combination thereof. For example, the power modules 212 may each be a 6000 mAh lithium-ion polymer (LiPo) battery. The power module(s) 212 are coupled to and provide power for the AMV management system 210 and the propeller motors.

In some implementations, one or more of the power modules may be configured such that it can be autonomously removed and/or replaced with another power module while the AMV is landed. For example, when the AMY lands at a delivery location, relay location and/or materials handling facility, the AMV may engage with a charging member at the location that will recharge the power module. In some implementations, a container may include a power module and, when the engagement mechanism of the AMV engages with the container, the power module of the container may provide power to the AMV. For example, when the AMV is navigating from the source location to a materials handling facility, it may carry an empty container that includes a power module and utilize power from that module to reach the materials handling facility. When at the materials handling facility, the empty container may be removed and a second container that includes the ordered item(s) attached to the AMV. The second container may also include a power module and the AMV can utilize the power module of the second container to navigate to the delivery location specified for the ordered item.

As mentioned above, the AMV 200 also includes an inventory engagement mechanism 214. The inventory engagement mechanism may be configured to engage and disengage items and/or containers that hold items. In this example, the inventory engagement mechanism 214 is positioned within a cavity of the frame 204 that is formed by the intersections of the rigid members 205. In this example, the inventory engagement mechanism is positioned beneath the AMY management system 210. In implementations with additional rigid members, the AMV may include additional inventory engagement mechanisms and/or the inventory engagement mechanism 214 may be positioned in a different cavity within the frame 204. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AMY management system 210.

While the implementations of the AMV discussed herein utilize propellers to achieve and maintain flight, in other implementations, the AMV may be configured in other manners. For example, the AMV may include fixed wings and/or a combination of both propellers and fixed wings. For example, the AMV may utilize one or more propellers to enable takeoff and landing and a fixed wing configuration or a combination wing and propeller configuration to sustain flight while the AMV is airborne.

FIGS. 3A-3F illustrate side views of various example configurations of the inventory engagement mechanism 214, illustrated in FIG. 2. Each inventory engagement mechanism is configured to define a cavity or holding area into which inventory and/or a container containing inventory may be positioned for the secure transport by an AMV. The cavity includes a top edge and side edges. In the examples illustrated in FIGS. 3A-3F, the cavity includes a top edge and four side edges. Two of the side edges are not shown so that the position, arrangement and operation of the other two side edges can be illustrated. In some implementations, the cavity may include fewer or additional edges.

Turning first to FIG. 3A, the inventory 302 is positioned within the inventory engagement mechanism 314 and held in position with angled support arms 316A and 316B. While the examples discussed with respect to FIGS. 3A-3D refer to inventory, in other implementations, the inventory engagement mechanisms discussed with respect to FIGS. 3A-3D operate in a similar manner with containers.

In the example of FIG. 3A, both angled support arms are configured to pivot around pivot points 318A and 318B, respectively. The pivoting of the angled support arms is controlled by one or more motors 320, such as a servo motor. The motors 320 may likewise be controlled to open and close the angled support arms by the AMV management system 210. When the angled support arms 316A and 316B are in a closed position, the inventory 302 is securely held in the inventory engagement mechanism 314 and can be aerially transported by the AMV 200. When the angled support arms are in an open position, the inventory 302 is released from the inventory engagement mechanism and exits the inventory engagement mechanism under gravitational force.

When the AMV 200 is retrieving inventory, it may position the inventory engagement mechanism 314 over the inventory, open the angled support arms 316A, 316B and lower itself, and thus the inventory engagement mechanism 314 down and around the inventory 302. As it reaches the inventory 302, the AMV management system 210 may instruct the motor(s) 320 to begin closing the angled support arms 316A, 316B and continue to align the inventory engagement mechanism 314 around the inventory 302 so that, as the angled support arms 316A, 316B close, the leading edge of each angled support arm will move underneath the inventory thereby securely enclosing the inventory 302 in the inventory engagement mechanism 314.

Likewise, when the AMY 200 is disengaging inventory (e.g., as part of inventory delivery), it may position itself and thus the inventory engagement mechanism 314 over a delivery location (e.g., flat surface, ground, table, chair, balcony) and the AMV management system 210 may instruct the motor(s) 320 to begin opening the angled support arms 316A, 316B. As the angled support arms open or move away from the inventory, gravity will extract the inventory 302 from the inventory engagement mechanism 314 and the inventory 302 will come to rest on the flat surface. When the inventory has been disengaged, the AMV 200 may reposition or close the angled support arms 316A, 316B and navigate away from the area.

FIG. 3B illustrates another side view of an example configuration of an inventory engagement mechanism 330 that may be coupled to the AMV 200 and used to engage and disengage inventory 302 to enable transport and delivery of the inventory 302. In this example, the inventory engagement mechanism 330 includes a cavity with two angled support arms 336A, 336B. However, in comparison to FIG. 3A, only one of the angled support arms 336B is configured to pivot about a point 338B. Similar to FIG. 3A, the pivot may be controlled by a motor 320, such as a servo motor. Likewise, the servo motor may be controlled by the AMV management system 210.

In the FIG. 3B example, the inventory is securely held in the inventory engagement mechanism 330 when the angled support arm 336B is in a closed position and will exit the inventory engagement mechanism when the angled support arm 336B is in an open position (positioned away from inventory 302).

FIG. 3C illustrates another side view of an example configuration of an inventory engagement mechanism 340 that may be coupled to the AMV 200 and used to engage and disengage inventory 302 to enable transport and delivery of the inventory 302. In this example, the inventory engagement mechanism 340 includes two angled support arms 346A, 346B. However, in comparison to FIG. 3A, rather than the entire angled support arm pivoting, only the bottom protruding edges/surfaces 349A, 349B pivot about pivot points 348A, 348B, respectively. Similar to FIG. 3A, the pivot of each bottom protruding edge 349A, 349B may be controlled by a motor 320, such as a servo motor. Likewise, the servo motor may be controlled by the AMV management system 210.

In the FIG. 3C example, the inventory is securely held in the inventory engagement mechanism 340 when the bottom protruding edges 349A, 349B of each angled support arm are in a closed position. Likewise, the inventory 302 will exit the inventory engagement mechanism 340 when one or both of the bottom protruding edges 349A, 349B are in an open position.

FIG. 3D illustrates another side view of an example configuration of an inventory engagement mechanism 350 that may be coupled to the AMV 200 and used to engage and disengage inventory 302 to enable transport and delivery of the inventory 302. In this example, the inventory engagement mechanism 350 includes two angled support arms 356A, 356B, each of which have bottom protruding edges/surfaces 359A, 359B. In comparison to FIG. 3C, only one of the bottom protruding edges, in this example bottom protruding edge 359B, is configured to pivot about a point 358B. Similar to FIG. 3A, the pivot may be controlled by a motor 320, such as a servo motor. Likewise, the servo motor may be controlled by the AMY management system 210.

In the FIG. 3D example, the inventory is securely held in the inventory engagement mechanism 350 when the bottom protruding edge 359B is in a closed position and will exit the inventory engagement mechanism when the bottom protruding edge 359B is in an open position.

In FIG. 3E, the inventory 302 is enclosed in a container 361 that is removably connected to the inventory engagement mechanism 360. The container 361 is connected with the inventory engagement mechanism through a series of members (e.g., pins) 362 or gears that are configured to engage and/or disengage the container. The positioning of the members 362 or gears are controlled by one or more motors 320, such as a servo motor. Alternatively, the members 362 or gears may be electromechanically controlled. For example, when there is no power and thus no magnetic charge, springs may cause the members 362 to move to an extended position, thereby securing the container in the inventory engagement mechanism. Likewise, when no power is applied, the gears may be locked into place so that the container is secured into the inventory engagement mechanism, as discussed below. Conversely, when power is applied, the resulting magnetic charge will cause the members to retract into the inventory engagement mechanism, thereby releasing a previously secured container from the inventory engagement mechanism. Likewise, gears may be configured to freely rotate when power is applied, thereby releasing the container from the inventory engagement mechanism.

The motors 320 may likewise be controlled by the AMV management system 210 to extend or retract the members 362 or rotate the gears. When the inventory engagement mechanism is positioned around the container 361 and the members 362 are in an extended position, the members securely hold the container, and thus the inventory 302, in the inventory engagement mechanism. In this example, the container has an extended ridge 364 that fits within the cavity of the inventory engagement mechanism 360. When the container is positioned within the cavity of the inventory engagement mechanism 360 and the members are in an extended position, the members are positioned under the ridge 364, thereby securing the container in the inventory engagement mechanism 360. When the members 362 are retracted, the container 361 is released from the inventory engagement mechanism and exits the inventory engagement mechanism 360 under gravitational force. Likewise, rather than members, gears with extended teeth may rotate within the cavity of the inventory engagement mechanism and engage slots in the sides of the container 361. When the container is positioned within the cavity of the inventory engagement mechanism 360, the gears may rotate and the teeth of the gears engage with slots in the side of the container 361, thereby securing the container in the inventory engagement mechanism 360. When the gears are rotated in an opposite direction, the container 361 is expelled from the cavity of the inventory engagement mechanism 360 and released.

When the AMV 200 is engaging a container 361, it may position the inventory engagement mechanism 360 over the container 361 and lower itself, and thus the inventory engagement mechanism 360, down and around the container 361. When the ridge 364 of the container 361 is within the cavity of the inventory engagement mechanism 360, the AMV management system 210 may instruct the motor(s) 320 to begin extending the members 362 such that the members become positioned beneath the extended ridge 364 of the container, thereby securing the container 361 in the inventory engagement mechanism 360. In implementations utilizing gears, the gears may be allowed to rotate freely as the AMV descends onto the container 361. When the container is inside the inventory engagement mechanism and the gears have rotated into the slots on the sides of the container 361, the gears may be locked into place, or prohibited from rotating in an opposite direction, thereby securing the container 361 in the cavity of the inventory engagement mechanism 360.

Likewise, when the AMV 200 is disengaging a container (e.g., as part of a delivery), it may position itself and thus the inventory over a surface (e.g., ground, table, chair, balcony) and the AMV management system 210 may instruct the motor(s) 320 to begin retracting the members 362 or rotating the gears in an opposite direction. When the members retract, gravity will extract the container 361 from the inventory engagement mechanism 360 such that the container 361 will come to rest on the flat surface. Likewise, when the gears rotate in the opposite direction, the container will be released from the inventory engagement mechanism and come to rest on the surface. When the container 361 has been disengaged, the AMV 200 may navigate away from the area.

FIG. 3F illustrates another side view of an example configuration of an inventory engagement mechanism 370 that may be coupled to the AMV 200 and used to engage and disengage a container 371 that holds inventory 302, thereby enabling transport and delivery of the inventory 302. In this example, the inventory engagement mechanism 370 includes a series of members 372 that are configured to extend or retract, for example, through the use of electromagnetics as discussed above. Alternatively, or in addition thereto, the inventory engagement mechanism may utilize gears that rotate within the inventory engagement mechanism.

Similar to FIG. 3E, when the members are extended and/or the gears rotated, they engage and secure a container 371 within the inventory engagement mechanism 370. When the members 372 are retracted or the gears rotated in an opposite direction, the container is released from the inventory engagement mechanism 370. However, in comparison to the container 361 illustrated in FIG. 3E, the container 371 of FIG. 3F may not have an extended ridge 364 under which the members are positioned. Instead, the container 371 may have one or more openings, holes or slots into which the members 372 and/or gears of the inventory engagement mechanism may mate with the container, thereby securing the container into the inventory engagement mechanism. Similar to FIG. 3E, the extending and retracting of the members and/or rotation of the gears may be controlled by a motor 320, such as a servo motor. Likewise, the motor 320 may be controlled by the AMY management system 210.

In the FIG. 3F example, the container 371 is securely held in the inventory engagement mechanism 370 when the members 372 are extended and will exit the inventory engagement mechanism when the members 372 are retracted. Likewise, when using gears, the container 371 is securely held in the inventory engagement mechanism 370 when the gears are rotated and mate with the slots of the container 371 and will exit the inventory engagement mechanism when the gears are rotated in an opposite direction and disengage with the slots of the container 371.

Figure 3G:
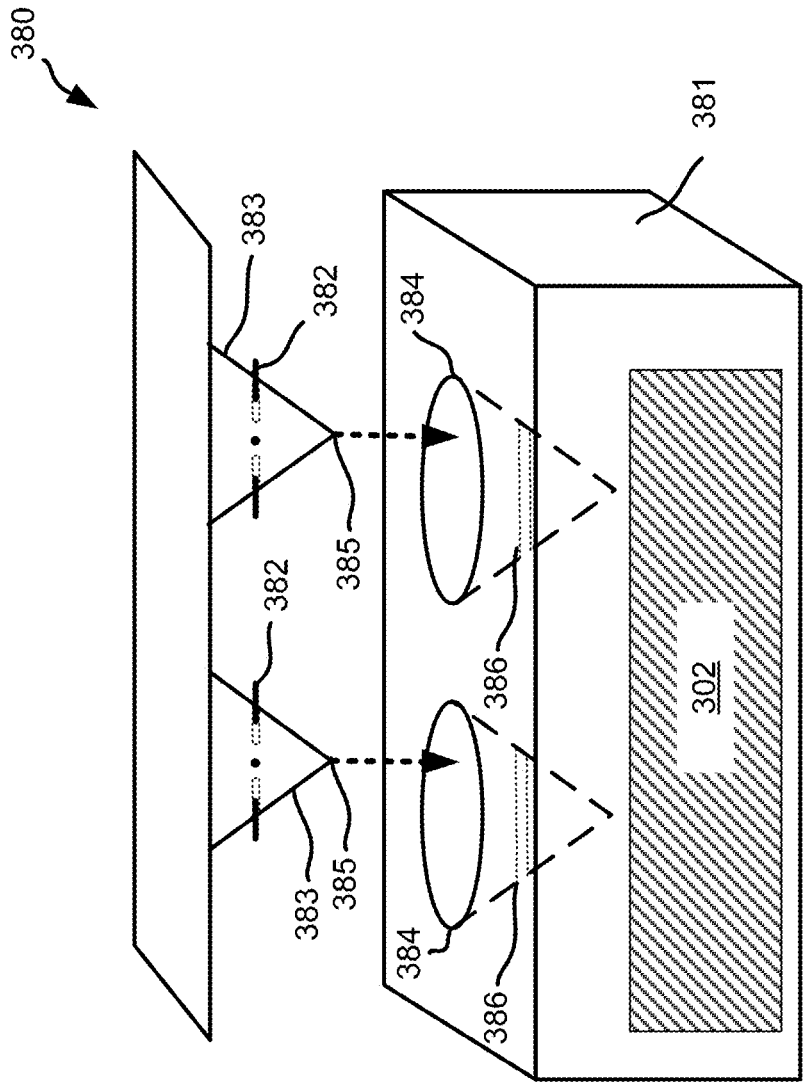

FIG. 3G illustrates yet another view of the inventory engagement mechanism 380 configured to engage and/or disengage a container 381 or other inventory, according to an implementation. In this example, the inventory engagement mechanism 380 may include one or more conical or other shaped extrusions 383 that extend from the inventory engagement mechanism 380 toward the container 381. Likewise, the container 381 may include one or more conical or other correspondingly shaped indentations 384 into which the inventory engagement mechanism 380 extrusions 383 may mate. As illustrated in FIG. 3G, the inventory engagement mechanism 380 includes two conical shaped extrusions 383 that extend downward toward the container 381. In other implementations, more or fewer extrusions may be used. Likewise, the container 381 includes corresponding conical indentations 384 into which the extrusions 383 of the inventory engagement mechanism 380 may mate when the AMV 200 is positioned over and onto the container 381.

The conical shape of the extrusions and corresponding indentations provide assistance in the alignment between the AMY 200 and the container 381 and the ultimate engagement of the container 381 by the inventory engagement mechanism 383 of the AMV 200. For example, as long as the points 385 of the extrusions 383 pass into the openings of the indentations 384 of the container 381, the conical shapes will help align the AMV 200 as it continues to lower over the container.

Likewise, in some implementations, the extrusions 383 may include one or more members 382 (e.g., pins) that may be used to secure the container to the inventory engagement mechanism 380 when engaged. As discussed above, the members 382 may be controlled by a motor (not shown), such as a servo motor. In another implementation, the members 382 may be electromagnetically controlled. For example, springs may cause the members 382 to extend out of the extrusions 383 when there is no electromagnetic charge. When a charge is applied, the electromagnet may cause the members 382 to retract into the extrusions 383.

The container 381 may include one or more rings, recesses, openings, or other forms of slots 386 within the indentations 384 into which the members 382 may extend to secure the container to the inventory engagement mechanism 380. For example, the members 382 of the inventory engagement mechanism 380 may be retracted while the AMY is landing on the container 381. When the inventory engagement mechanism 380 has fully mated with the container 381, the members 382 may be released such that they extend into the slots 386 and secure the container 381 to the inventory engagement mechanism 380. In some implementations, the ends of the members 382 may be angled so that as the conical shaped extrusions 383 of the inventory engagement mechanism 380 mate with the indentations of the angle, the indentation will push the members 382 into the retracted position until they reach the slots 386 within the indentations and release, thereby securing the container 381.

While the example discussed above illustrates conical extrusions 383 and corresponding indentations 384 that are pointed, in other implementations, other shapes and/or sizes of extrusions and/or indentations may be utilized. For example, the extrusions and indentations may be curved rather than pointed. Likewise, rather than having the members 382 as part of the extrusions 383, in other implementations, the members may be included in the indentations 384 and the corresponding slots may be included in the extrusions 383.

The examples discussed above with respect to FIGS. 3A-3G are merely illustrative and it will be appreciated that the inventory engagement mechanism may be configured in many different forms. A feature of any inventory engagement mechanism configuration is the ability to securely engage and disengage inventory and/or containers so that the inventory and/or container can be aerially transported by an AMV 200 and delivered to a delivery location. For example, in addition to or as an alternative to utilizing pivoting angled support arms, members and/or gears, in some implementations, the angled support arms may be configured to move in a horizontal direction such that the size of the cavity formed to contain the inventory 302 or container can be adjusted to account for the size of the inventory and/or container to be engaged, transported and disengaged. As another example, in some implementations, the inventory engagement mechanism may include a positioning arm and/or cable that may be used to position, raise and/or lower inventory. In some implementations, the positioning arm or cable may operate as the inventory engagement mechanism. In other implementations, the positioning arm or cable may operate as part of an inventory engagement mechanism. In one implementation, a positioning cable may be included that removably attaches to the inventory and can be used to engage the inventory and raise the inventory up to a location of the AMV. Likewise, when the inventory is being disengaged at a delivery location, rather than having to land the AMV, the positioning cable may be extended so that the inventory is lowered to the landing area. When the inventory has reached the landing area, the positioning cable may be detached from the inventory and retracted back into the AMV.

Figure 4:
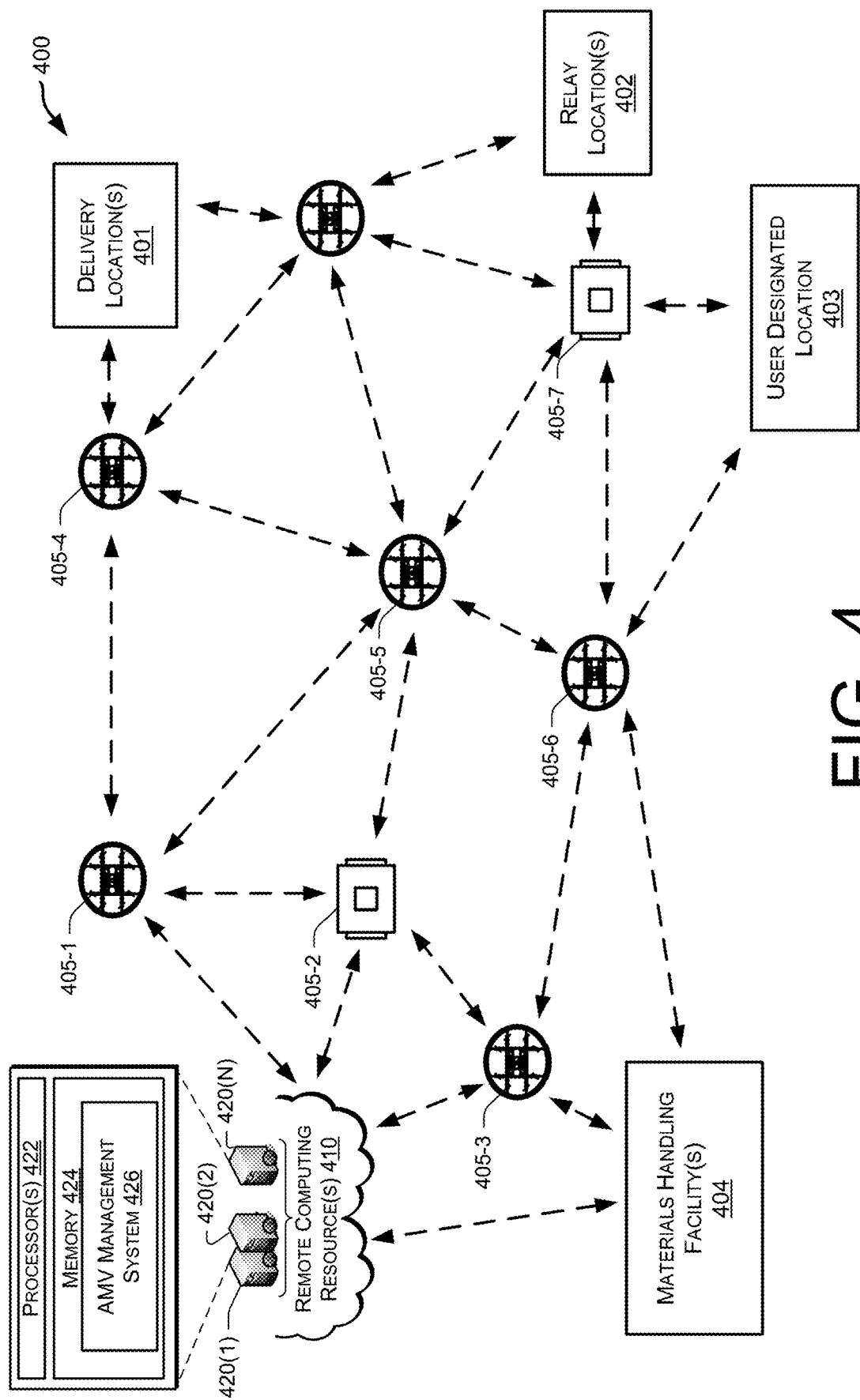
FIG. 4 depicts a diagram of an automated mobile vehicle environment, according to an implementation.

FIG. 4 depicts a block diagram of an AMV environment 400 that includes AMVs 405, delivery locations 401, relay locations 402, materials handling facilities 404, user designated locations 403, and remote computing resources 410, according to an implementation. Each of the AMVs 405, delivery locations 401, relay locations 402, materials handling facilities 404, user designated locations 403 and/or remote computing resources 410 may be configured to communicate with one another. For example, the AMVs 405 may be configured to form a wireless mesh network that utilizes Wi-Fi or another wireless means of communication, each AMV communicating with other AMVs within wireless range. In other implementations, the AMVs 405, AMV management system 426, materials handling facilities 404, relay locations 402 and/or the delivery locations 401, and user designated locations 403 may utilize existing wireless networks (e.g., cellular, Wi-Fi, satellite) to facilitate communication. Likewise, the remote computing resources 410, materials handling facilities 404, delivery locations 401, user designated locations 403 and/or relay locations 402 may also be included in the wireless mesh network. In some implementations, one or more of the remote computing resources 410, materials handling facilities 404, delivery locations 401, user designated locations 403, and/or relay locations 402 may also communicate with each other via another network (wired and/or wireless), such as the Internet.

As discussed above, the AMVs 405 may be aerial based AMVs, such as AMV 405-1, 405-3, 405-4, 405-5, 405-6, ground based AMVs, such as AMVs 405-2, 405-7, and/or water based AMVs (not shown). Regardless of the navigation method (ground, air, water), the AMVs 405 are configured to communicate with one another and with other components of the environment 400.

The remote computing resources 410 may form a portion of a network-accessible computing platform implemented as a computing infrastructure of processors, storage, software, data access, and other components that is maintained and accessible via a network, such as the mesh network and/or another wireless or wired network (e.g., the Internet). As illustrated, the remote computing resources 410 may include one or more servers, such as servers 420(1), 420(2), . . . , 420(N). These servers 420(1)-(N) may be arranged in any number of ways, such as server farms, stacks, and the like that are commonly used in data centers. Furthermore, the servers 420(1)-(N) may include one or more processors 422 and memory 424 which may store an AMY management system 426.

The AMV management system 426 may be configured, for example, to communicate with the delivery locations 401, AMVs 405, materials handling facilities 404, user designated locations 403, and/or relay locations 402.

When a message is sent to or from an AMV, the message may include an identifier for the AMV and each AMV may act as a node within the network, forwarding the message until it is received by the intended AMV. For example, the AMV management system 426 may send a message to AMV 405-6 by transmitting the message and the identifier of the intended receiving AMV to one or more of AMVs 405-1, 405-2, 405-3 that are in wireless communication with the AMV management system 426. Each receiving AMY will process the identifier to determine if it is the intended recipient and then forward the message to one or more other AMVs that are in communication with the AMV. For example, AMV 405-2 may forward the message and the identification of the intended receiving AMV to AMV 405-1, 405-3 and 405-5. In such an example, because 405-3 has already received and forwarded the message, it may discard the message without forwarding it again, thereby reducing load on the mesh network 400. The other AMVs, upon receiving the message, may determine that they are not the intended recipients and forward it on to other nodes. This process may continue until the message reaches the intended recipient.

In some implementations, if an AMV loses communication with other AMVs via the wireless mesh network, it may activate another wireless communication path to regain communication. For example, if an AMV cannot communicate with any other AMVs via the mesh network 400, it may activate a cellular and/or satellite communication path to obtain communication information from the AMV management system 426, materials handling facility 404, relay location 402, user designated location 403 and/or a delivery location 401. If the AMV still cannot regain communication and/or if it does not include an alternative communication component, it may automatically and autonomously navigate toward a specific location (e.g., a nearby materials handling facility 404, relay location 402, the user designated location 403 from which it originated, and/or a delivery location 401).

The wireless mesh network 400 may be used to provide communication between AMVs (e.g., to share weather information, location information, routing information, and landing areas), AMV management system 426, materials handling facilities 404, delivery locations 401, user designated locations 403 and/or relay locations 402. Likewise, in some implementations, the wireless mesh network may be used to deliver content to other computing resources, such as personal computers, electronic book reading devices, audio players, mobile telephones, tablets, desktops, or laptops. For example, the mesh network may be used to deliver electronic book content to electronic book reading devices of customers.

Figure 5:
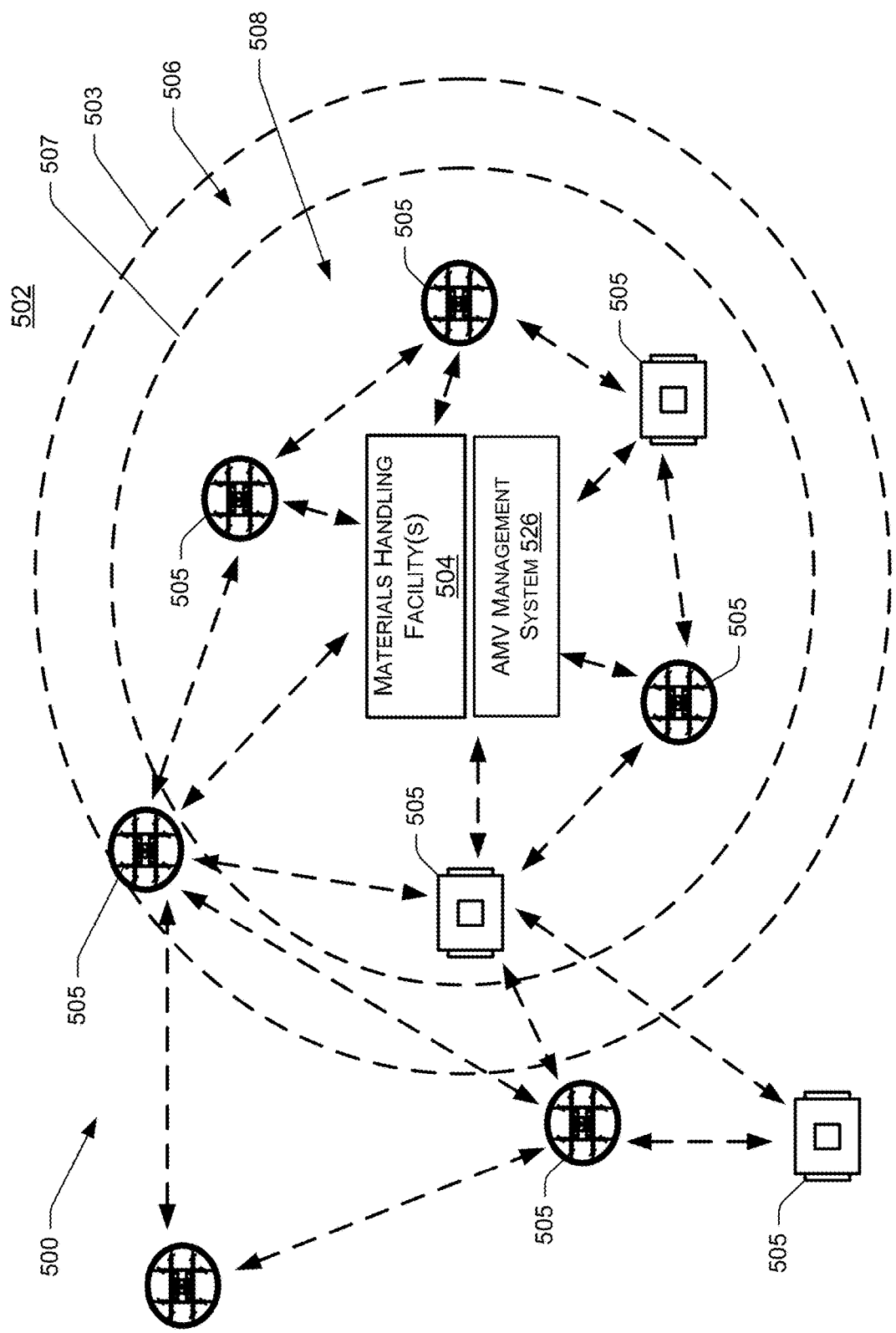
FIG. 5 depicts a diagram showing additional details of an automated mobile vehicle environment, according to an implementation.

FIG. 5 depicts a diagram showing additional details of an automated mobile vehicle environment 500, according to an implementation. In this example, the environment 500 illustrates an area around a commercial materials handling facility. As discussed in further detail below, when an AMV approaches a materials handling facility (e.g., for item pickup and/or item return), as it approaches the materials handling facility, it may communicate with the materials handling facility and provide control of the AMV to the materials handling facility. In this example, AMVs outside the perimeter boundary 503 and located in open area 502 are not under direct control by the AMV management system 526. For example, the AMVs may be operating under autonomous flight control navigating to a location specified in routing instructions provided by the AMV management system 526. As discussed above, AMVs 505 may continually or periodically communicate with other AMVs 505, the materials handling facility 504, or the AMV management system 526.

The transition area 506 located between the perimeter boundary 503 and the interior boundary 507 is a designated area for authorizing AMVs and establishing control of the AMV. The transition area 506 may be any size area and configured to be any defined distance from the materials handling facility 504. For example, the transition area may include a one mile perimeter around the materials handling facility. In other implementations, the transition area may be larger or smaller. When an AMV 505 enters the transition area 506, it may be instructed to remain or loiter in the transition area until it is verified. As discussed further below, verification may include identifying the AMV, the corresponding routing instructions, the anticipated weight of the AMV, or image analysis of the AMV.

Finally, once an AMV in the transition area 506 is verified, the AMV management system 526 takes control of the AMV 505 and moves the AMV into the controlled area 508. Similar to the transition area 506, the controlled area 508 may be any defined area around the materials handling facility 504.

AMVs located in the controlled area 508 are controlled by the AMV management system 526. For example, the AMV management system 526 may navigate an AMV to a staging and/or recharging area within the controlled area 508 until the container with the item to be retrieved by the AMV is available for retrieval. Aerial AMVs, for example, may be instructed to loiter at a specific location within the controlled area until they receive additional instructions. Because aerial AMVs have the ability to remain stationary when airborne, numerous AMVs may be vertically staged in a small area within the controlled area 508. Likewise, AMVs may be staged by landing them on flat areas (e.g., parking lots or building rooftops).

As another example, the AMV management system 526 may instruct an AMV to a return area to drop off an item being returned and/or drop off an empty container. Likewise, when the container to be retrieved by the AMV is available for pickup, the AMV management system 526 may instruct the AMV to navigate to the location of the container or the item, engage the container or the item and then navigate the AMV back to the transition area 506.

In some implementations, rather than AMVs in the controlled area being directly controlled by the AMV management system 526, the AMVs may continue to communicate with one another and the AMV management system and self-organize. For example, all of the AMVs in the controlled area may communicate to identify location or intent, and based on the shared information determine the routing, staging and navigation for each AMV collectively.

When an AMV is exiting the controlled area 508 and enters the transition area 506, the AMV management system 526 may return control to the AMV 505 and allow the AMV to autonomously navigate to its next destination.

The transition area 506 and/or the controlled area 508 may be dynamically adjusted in size. For example, if numerous AMVs are approaching the materials handling facility 504, the transition area 506 may be expanded further into the open area 502 to allow additional room and/or time for authorizing incoming AMVs 505. Likewise, if there are numerous AMVs at and/or approaching the materials handling facility 504, the controlled area 508 may be expanded to provide additional staging and/or navigation areas for the AMVs. Other factors, such as historical trends during the period of time, anticipated congestion, weather, value of items to be transported, time of day, day of week, or time of year may be considered as a basis for increasing and/or decreasing the transition area 506 and/or the controlled area 508.

Figure 6:
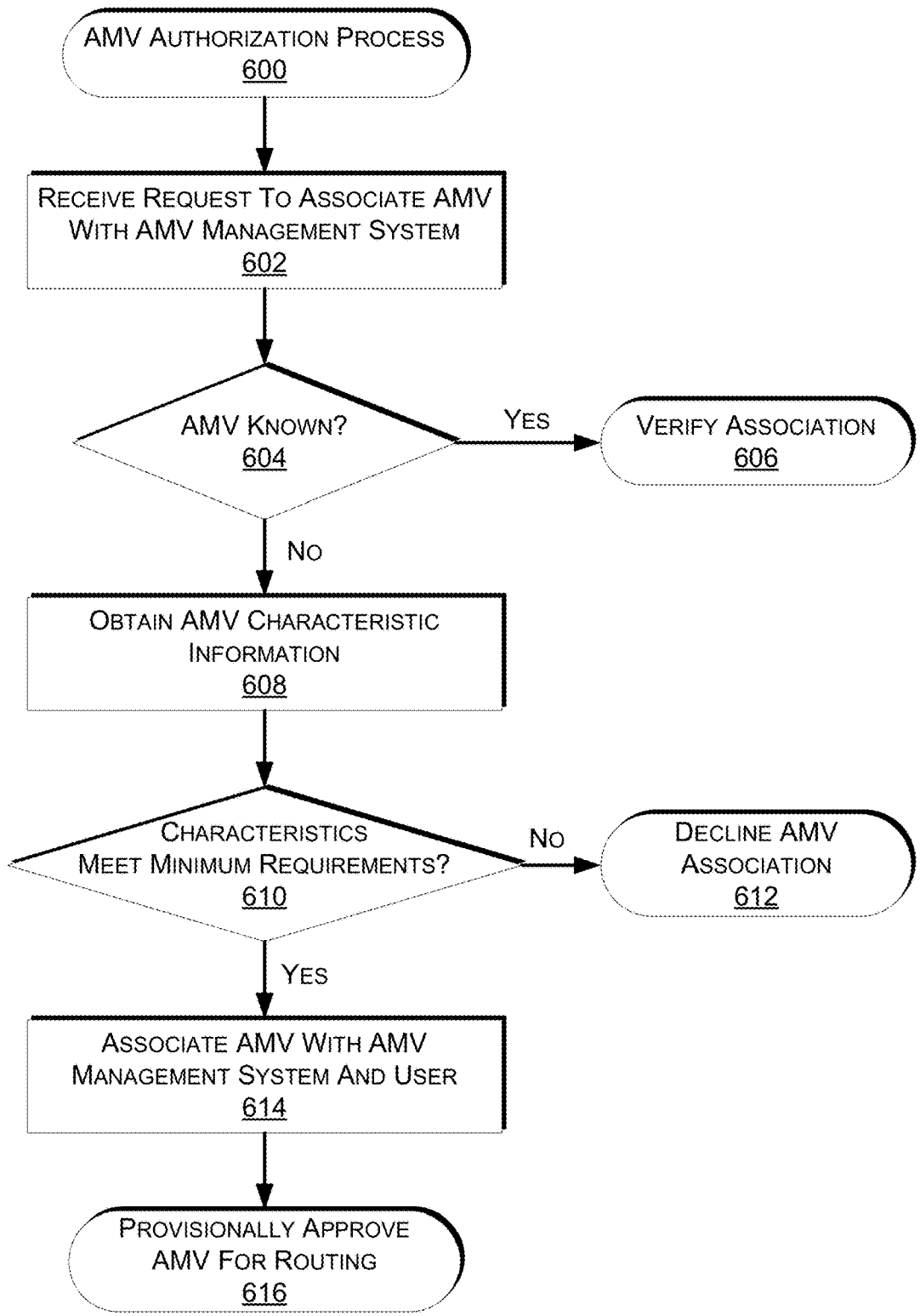
FIG. 6 is a flow diagram illustrating an example automated mobile vehicle authorization process, according to an implementation.

FIG. 6 is a flow diagram illustrating an example process for presenting an automated aerial delivery vehicle delivery option for an item, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 11:
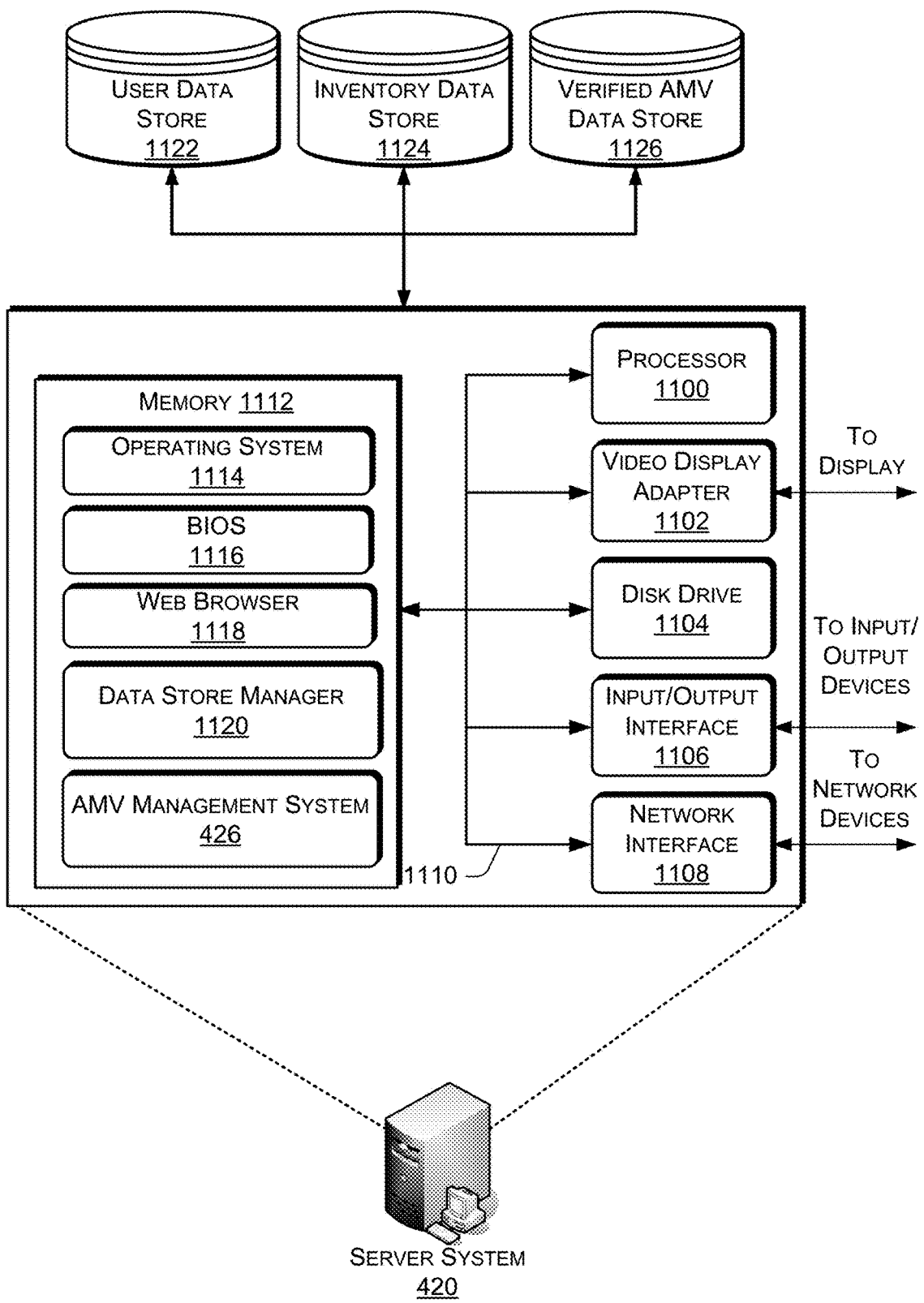
FIG. 11 is a block diagram of an illustrative implementation of a server system that may be used with various implementations.

The example authorization process 600 begins by receiving a request to associate an AMV with the AMV management system, as in 602. The request may include an AMV identifier, AMV characteristics and/or other information. As discussed above, AMVs may be provided to users by an entity associated with or authorized by the AMV management system, the user may provide their own AMV and/or the user may obtain an AMV from another source. If the AMV is provided by an entity associated with or authorized by the AMV management system, the AMV may be considered known and/or known to satisfy the minimum requirements specified by the AMV management system. For example, AMVs provided by an entity associated with or authorized by the AMV management system may be pre-verified and have an AMV identifier associated therewith and maintained by the AMV management system in a verified AMV data store 1126 (FIG. 11).

AMVs that are provided by the user or obtained from another source are not pre-verified or known to the AMV management system. In such an example, a user may obtain an application or software program that is installed on the controller or other processor of the AMV. The application may be configured to determine characteristics of the AMV, establish communication with the AMV management system and request to have the AMV associated with the AMV management system. For example, the software program may be configured to determine the component types included on the AMV, the electronic speed control (ESC) settings and configuration, or propeller and motor configuration.

When a request is received, the example process 600 determines whether the request is from a new AMV or a known AMV, as in 604. If the AMV is already known and/or verified, the verification is confirmed, as in 606, by comparing the AMV identifier with stored AMV identifier information maintained in the verified AMV data store 1126. However, if it is determined that the AMV is not known, the example process 600 may obtain AMV characteristic information from the AMV and/or the software program executing on the AMV, as in 608.

Characteristic information may include any information about the AMV. For example, characteristic information may include a model and/or serial number of the AMV, navigation capabilities, available power, power module size, motor type and/or size, propeller size, number of motors, whether the AMV has a fire suppression system, ability for the AMV to be controlled by the AMV management system, weight of the AMV, lift capacity, override control capabilities, an image of the AMV, communication capability (e.g., Wi-Fi, cellular, satellite, custom radio), and the like. Characteristic information may be obtained from a software program executing on a component of the AMV and/or from a user that is requesting authorization of the AMV. For example, some or all of the AMV characteristic information may be provided by the user directly to the AMV management system.

Based on the received characteristic information, a determination is made as to whether the AMV characteristics meet the minimum requirements, as in 610. As discussed above, one or more minimum requirements may be established that must be satisfied before an AMV is associated with the AMV management system and utilized. If the minimum requirements are not satisfied, the requested association is declined, as in 612. In some implementations, the example process 600 may provide information back to the user identifying the characteristics of the AMV that do not satisfy the minimum requirements.

If it is determined that the minimum requirements are satisfied, the AMV is associated with the AMV management system and the user. For example, the software program executing on the AMV and/or the AMV management system may obtain user information from the user that is providing the AMV and/or generate a unique identifier for the AMV that is provided to the AMV management system. The AMV management system may utilize the unique identifier and the user information to associate the AMV with the user and the AMV management system, as in 614. In other implementations, the software program and the AMV management system may utilize an encryption scheme to generate a unique identifier for the AMV that is known to both the AMV and the AMV management system but not exchanged as part of the example authorization process 600.

After associating the AMV with the user and the AMV management system, the AMV is identified as provisionally approved, as in 616. An AMV may be provisionally approved until it is finally verified and approved at a materials handling facility. For example, there may be some characteristics and/or other information that cannot be verified by the software program executing on the AMV. A provisionally approved AMV may be utilized for user selection as a method of order delivery. When the AMV enters the transition area associated with the materials handling facility containing the item to be picked up, it is identified as provisionally approved and final verification and approval is performed, as discussed further below. In other implementations, when the AMV is provisionally approved, it may be instructed to navigate to a verification and approval location, which may be a materials handling facility or another location, for final approval and verification. In other implementations, it may remain in the transition area until verified and approved.

Figure 7:
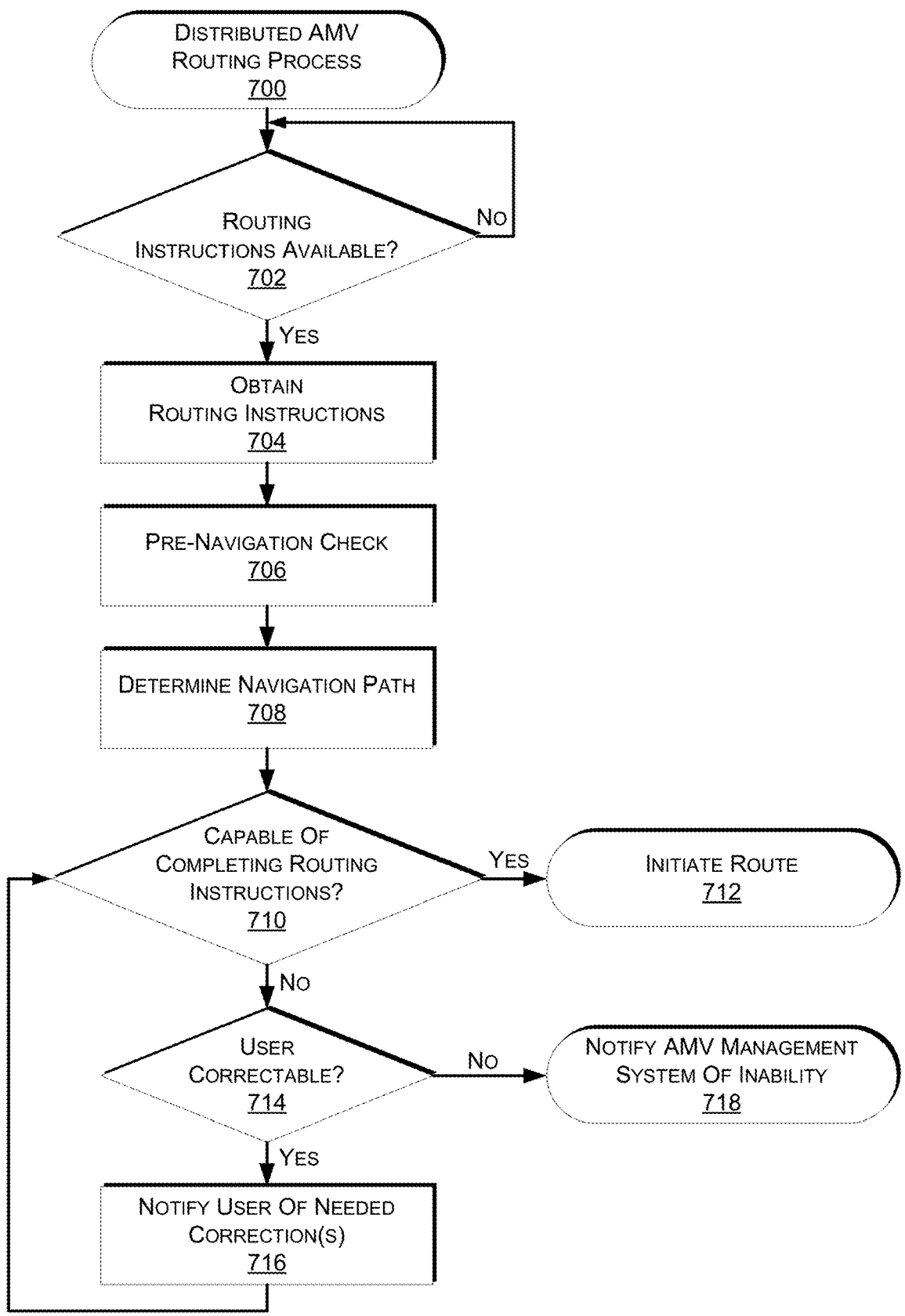
FIG. 7 is a flow diagram illustrating an example distributed automated mobile vehicle routing process, according to an implementation.

FIG. 7 is a flow diagram illustrating an example distributed automated mobile vehicle routing process 700, according to an implementation. In some implementations, the example process 700 may be performed by a software program executing on an AMV, such as an AMV owned or controlled by a user that is independent from the AMV management system.

The example process 700 begins by determining if routing instructions for the AMV are available, as in 702. For example, the software program executing on the AMV may periodically connect with the AMV management system to determine if routing instructions are available for the AMV. Alternatively, or in addition thereto, the AMV management system may send or "push" to the AMV routing instructions or a notification that routing instructions are available.

If it is determined that routing instructions are available, the routing instructions are obtained, as in 704. For example, if the AMV has received a notification that routing instructions are available, it may connect with the AMV management system and obtain the routing instructions. The routing instructions may identify, for example, a departure time, an arrival time, a materials handling facility location, a relay location, a delivery location, a delivery time, or anticipated payload weight.

In addition to obtaining the routing instructions, a pre-navigation safety check may be performed, as in 706. For example, one or more images of the area surrounding the AMV may be captured and processed to ensure there are no obstacles that may contact the AMV. Likewise, available power, operability of the motors, firmware version of the AMV system, verification logs, optics, wireless connectivity, navigation capabilities, weather conditions, or voltage regulation may also be checked to ensure that the AMV is in a safe condition for navigation.

A navigation path for the AMV is also determined, as in 708. The navigation path may be determined based on, for example, the location of the AMV, the location of the materials handling facility identified in the routing instructions, whether the AMV is to stop at a relay location, or the available routes.

Based on the routing instructions, the information determined from the pre-navigation safety check, and the determined navigation path, a determination is made as to whether the AMV is capable of completing the routing instructions, as in 710. For example, if the routing instructions instruct the AMV to navigate to a materials handling facility, retrieve an item weighing an estimated ten pounds and return to a user designated location, the AMV may determine a navigation path and anticipated power requirements for completing the navigation. If the available power determined during the pre-navigation safety check is not sufficient, it may be determined that the AMV is not able to complete the routing instructions.

If it is determined that the AMV is capable of completing the routing instructions, the route is initiated, as in 712. However, if it is determined that the AMV is not capable of completing the routing instructions, a determination is made as to whether the inability is correctable by the user associated with the AMV, as in 714. For example, if the power module of the AMV is only half charged and at least a three-quarter charge is needed to complete the routing instructions, it may be determined that that inability is correctable by the user. Likewise, if analysis of the surrounding area identifies an obstruction (e.g., the AMV is located indoors), it may be determined that the inability is correctable by the user.

If it is determined that the inability is correctable by the user, the user is notified of the needed correction, as in 716. Upon notifying the user of the needed correction, the example process 700 returns to decision block 710 and continues. However, if it is determined that the inability is not user correctable, the AMV management system is notified of the AMV's inability to complete the routing instructions, as in 718.

Figure 8:
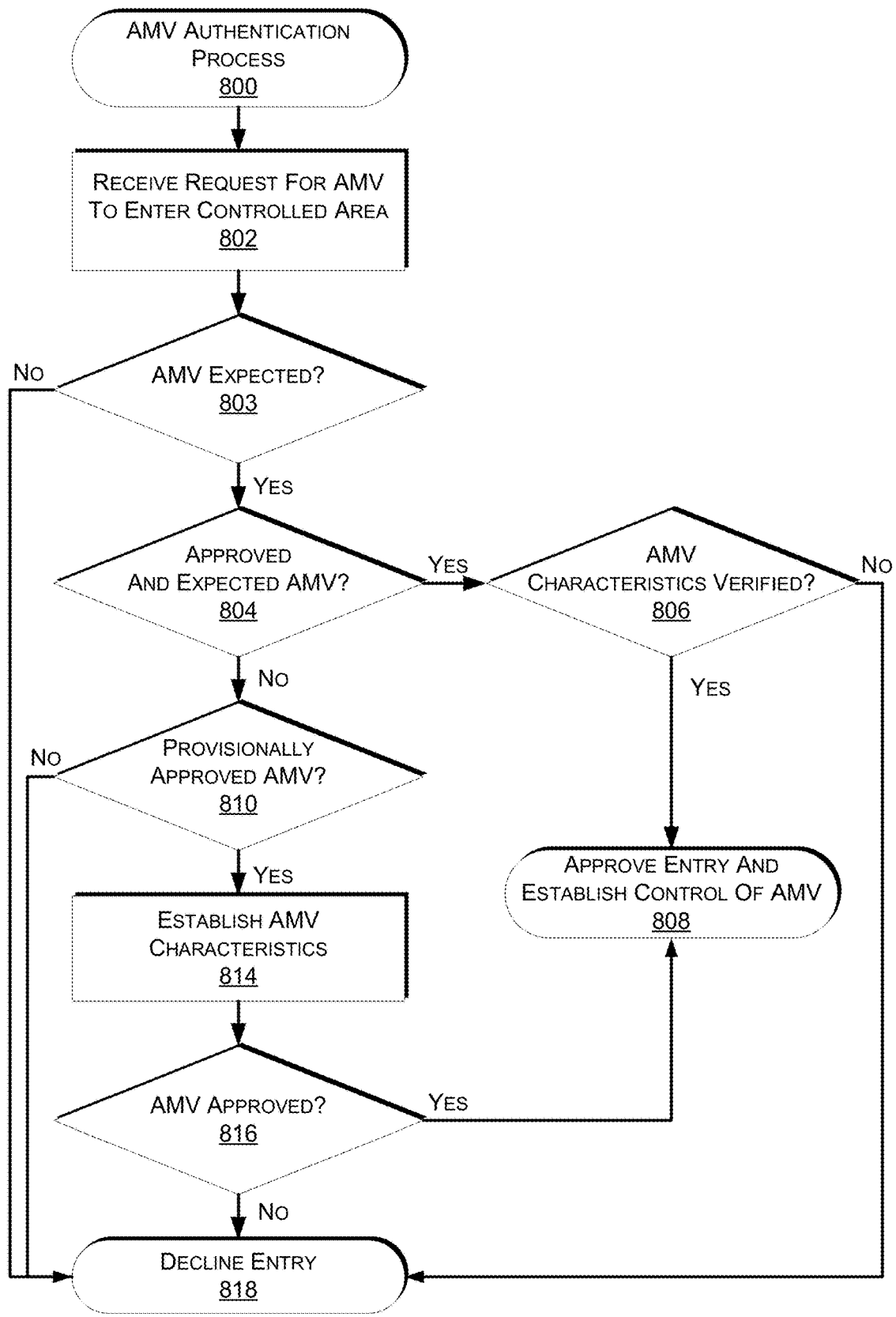
FIG. 8 is a flow diagram illustrating an example automated mobile vehicle authentication process, according to an implementation.

FIG. 8 is a flow diagram illustrating an example automated mobile vehicle authentication process 800, according to an implementation. The example process 800 begins by receiving a request from an AMV to enter a controlled area, as in 802. As discussed above with respect to FIG. 5, each materials handling facility may include a controlled area that surrounds the materials handling facility. AMVs in the controlled area are verified and controlled by the AMV management system. Likewise, surrounding the controlled area may be a transition area. When an AMV enters the transition area, the AMV may submit a request to the AMV management system to enter the controlled area and may remain in the transition area until verified.

Upon receiving a request to enter the controlled area, a determination is made as to whether the AMV submitting the request is expected, as in 803. An expected AMV is an AMV that has received instructions to navigate to the materials handling facility. If it is determined that the AMV is not expected, entry into the controlled area is declined, as in 818 (discussed below). If it is determined that the AMV is expected, a determination is made as to whether the AMV is an approved AMV, as in 804. As discussed above, an approved AMV is an AMV that has been verified and approved by the AMV management system and corresponding information is maintained in the verified AMV data store.

If it is determined that the AMV is approved, the AMV characteristics information is obtained from the verified AMV data store. Likewise, characteristic information of the AMV are obtained from the AMV while located in the transition area. The stored AMV characteristic information is compared with the obtained AMV characteristic information to verify that no changes or unexpected characteristics exist. For example, the speed of each motor required to hold the AMV in a loiter position in the transition area may be provided by the AMV and a determination made as to whether the required speed of the motors corresponds with the stored weight and/or lift characteristics of the AMV.

Upon verifying the AMV, as in 806, the AMV is approved for entry into the controlled area, the AMV management system establishes control of the AMV and navigates the AMV to a location within the controlled area, as in 808.

If it is determined that the AMV requesting entry is not an approved AMV, a determination is made as to whether the AMV is provisionally approved, as in 810. A provisionally approved AMV is an AMY that is new to the environment, has completed the AMV authorization process 600 (FIG. 6) but has not yet been verified and approved. If it is determined that the AMV is provisionally approved, one or more AMV characteristics are determined for the AMV, as in 814. As discussed above, AMV characteristic information may include, for example, the motor speed required to maintain the AMY in a loiter position within the transition area, a power supply remaining, a calculated weight, navigation capabilities, fire suppression capabilities, or ability to be controlled by the AMV management system. In some implementations, AMV characteristics may be determined automatically. In other implementations, user involvement and/or image analysis of one or more images captured of the AMV may be processed. For example, the structural stability of a new AMV may be determined by an agent of the materials handling facility as part of the AMV characteristic determination. Each AMV characteristic is associated with the AMV and stored in the verified AMV data store.

After establishing the AMY characteristics, a determination is made as to whether the AMV characteristics satisfy the minimum requirements for the environment and the AMY can be approved for use, as in 816. If the AMY is approved, the example process 800 proceeds to block 808 and continues. However, if it is determined that a provisionally approved AMV is not approved for entry into the controlled area, or if it is determined in decision block 810 that the AMV is not provisionally approved, entry into the controlled area is declined, as in 818. In some implementations, if a provisionally approved AMV is not approved and entry is declined, the AMV management system may coordinate with the inventory management system to enable delivery of the user's order using another delivery means (e.g., another AMV). Likewise, the user may be provided a notification that the AMV has not been approved and the user's order will be delivered differently than requested. In some implementations, the user may be provided information as to why the AMV was not approved. The AMV management system may also provide routing instructions to the AMV to return to the user designated location from which it originated. The AMV management system may also notify an associate of the materials handling facility and/or another entity that an AMV was declined entry into the controlled area.

Returning to decision block 806, if it is determined that the AMV characteristics of an approved AMV are not verified, entry by the AMV into the controlled area is declined, as in 818. In some implementations, a secondary or manual review of the AMV characteristics may be performed to confirm whether the AMV can be verified. If an approved AMV is not verified and entry is declined, the AMV management system may coordinate with the inventory management system to enable delivery of the user's order using another delivery means (e.g., another AMV). Likewise, the user may be provided a notification that the AMV has not been approved and the user's order will be delivered differently than requested. In some implementations, the user may be provided information as to why the AMY was not verified. The AMY management system may also provide routing instructions to the AMV to return to the user designated location from which it originated. The AMV management system may also notify an associate of the materials handling facility and/or another entity that an AMV was declined entry into the controlled area.

Figure 9:
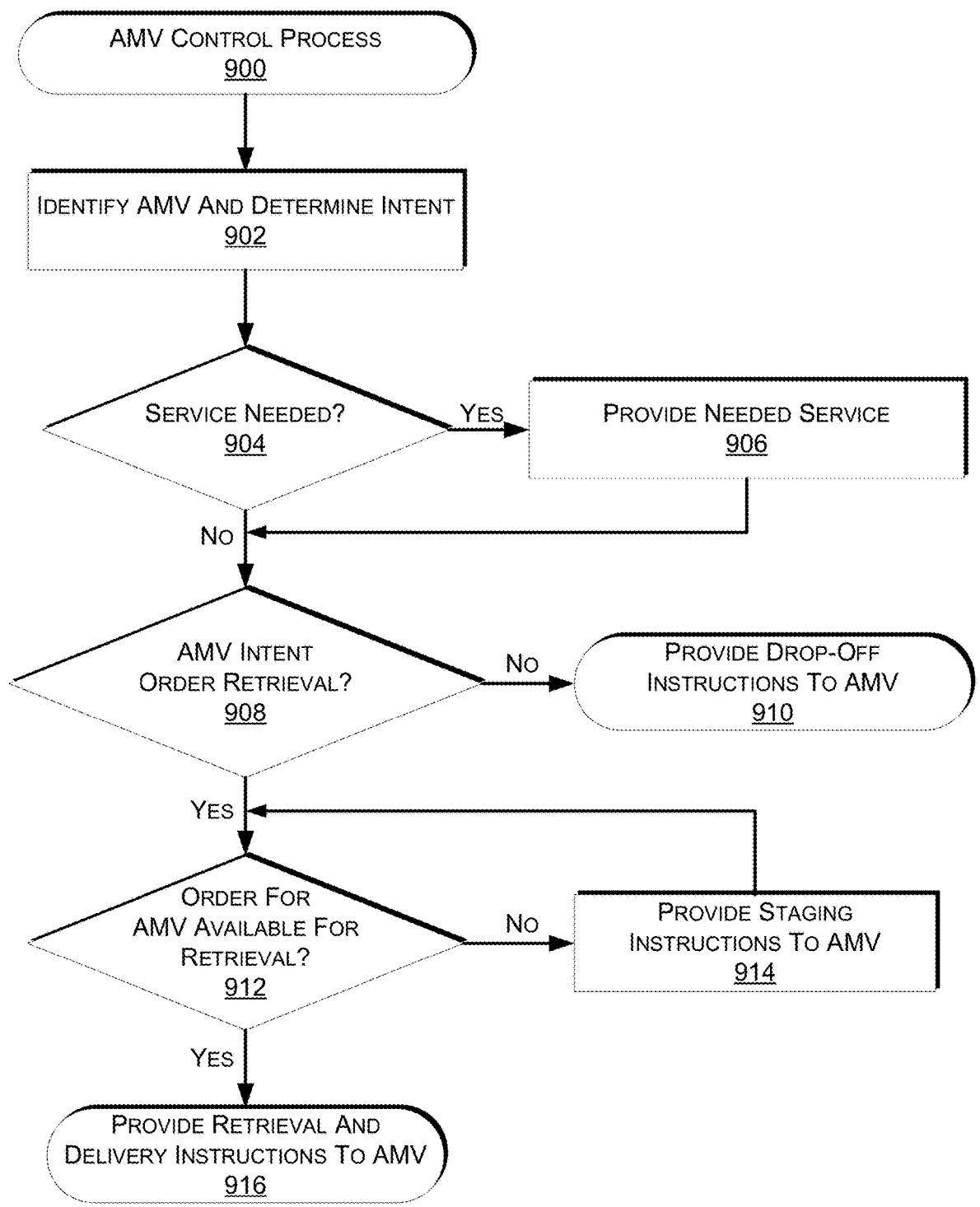
FIG. 9 is a flow diagram illustrating an example automated mobile vehicle control process, according to an implementation.

FIG. 9 is a flow diagram illustrating an example automated mobile vehicle control process 900, according to an implementation. The example process 900 begins by identifying an AMV in the transition area and determining the intent of the AMV, as in 902. For example, once an AMV has been approved, the order or return associated with the AMV is identified to determine the intent of the AMV. For example, if a user places an order for delivery using their AMV, the AMV identifier of the AMV associated with the user is associated with the order and maintained by the AMV management system. When the AMV is approved at the transition area, the AMV management system utilizes the AMV identifier to determine the order associated with the AMV that is to be picked up by the AMV. Likewise, if the AMV is arriving to return an item, the return information created when the user initiated the return is associated with the AMV identifier and used to determine the intent of the AMV.

In addition to determining the intent of the AMV, a determination may also be made as to whether the AMV needs to be serviced, either now or at some point before the AMV departs the controlled area, as in 904. Service for an AMV may include, for example, recharging or replacing one or more power modules, repairing the AMV, or updating software and/or firmware of the AMV. If it is determined that service is needed for the AMV, the AMV management system navigates the AMV to a service location to perform the necessary service, as in 906.

After providing necessary service or if it is determined that service is not needed, a determination is made as to whether the intent of the AMV is to pick up or retrieve an order, as in 908. If it is determined that the intent is not order pickup, meaning that the AMV is at the materials handling facility to drop off an item that is being returned, the AMV is navigated to a drop-off location and instructed to drop the returned item at the drop off location, as in 910. If the intent of the AMV is order pickup, a determination is made as to whether the order is available for retrieval, as in 912. If the order is available for retrieval, the AMV is navigated to the location of the order and instructed to retrieve the order and secure it with the inventory engagement mechanism, as in 916. If the order is not ready for pickup, the AMV is guided to and instructed to remain at a staging area, as in 914. The staging area may be an area where the AMV can position itself and utilize less or no power, recharge, or receive connectivity, until it is instructed to retrieve the order. After providing staging instructions to the AMV, the example process 900 may return to decision block 912 and continues.

While the example process 900 describes AMV intent as either an order retrieval or an item return, it will be appreciated that an AMV arriving into a controlled area of a materials handling facility may have other intents. For example, if the AMV is new to the AMV management system and has been provisionally approved, it may have arrived at the materials handling facility to receive final approval. Likewise, in some implementations, the AMV intent may include any combination of intents (e.g., both an item return and an order retrieval). In still other implementations, the AMVs intent may be a return of the AMV itself to the materials handling facility.

Figure 10:
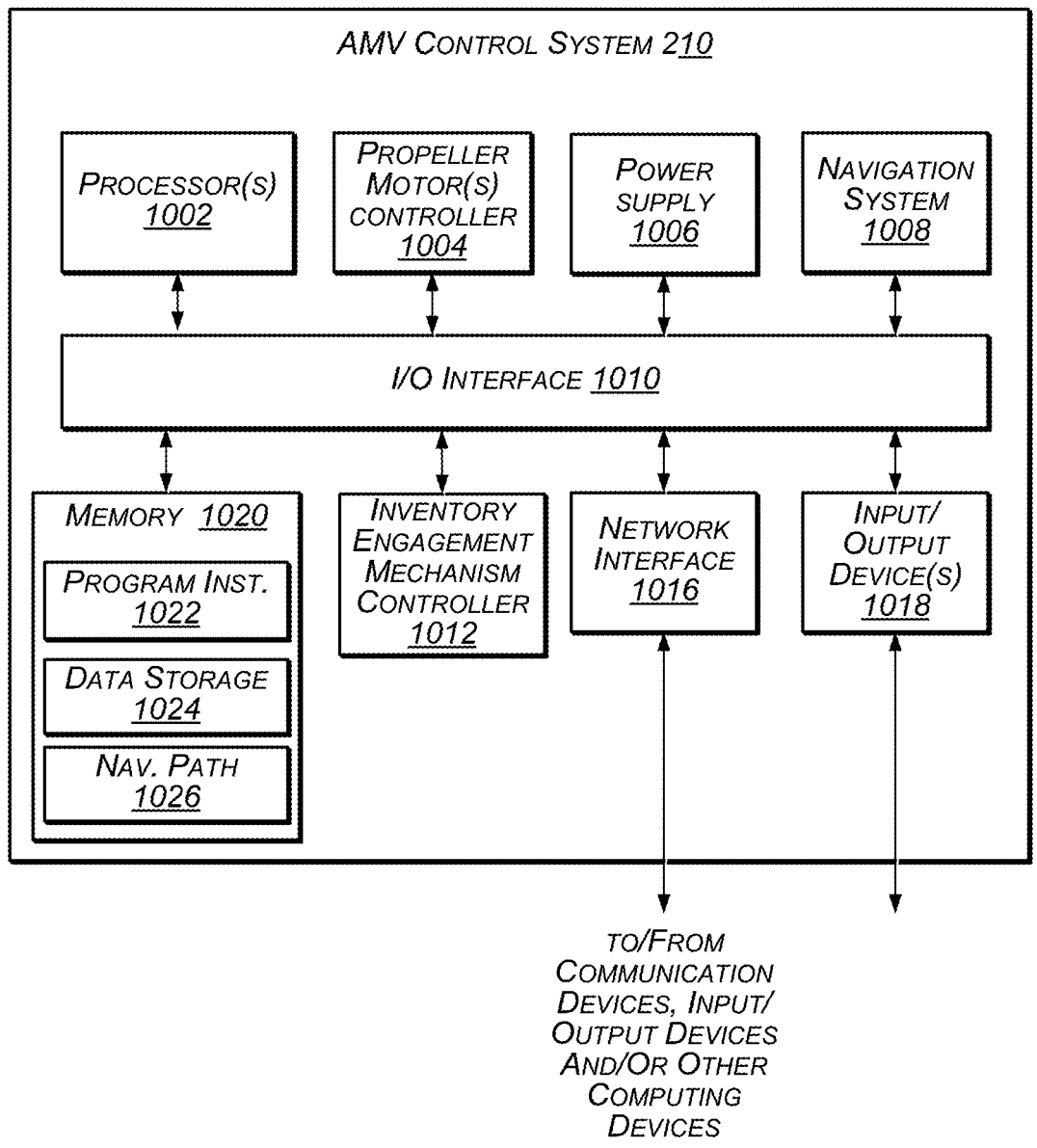
FIG. 10 is a block diagram illustrating various components of an automated aerial delivery vehicle control system, according to an implementation.

FIG. 10 is a block diagram illustrating an example AMY management system 210 of the AMV 200. In various examples, the block diagram may be illustrative of one or more aspects of the AMY management system 210 that may be used to implement the various systems and methods discussed above. In the illustrated implementation, the AMV management system 210 includes one or more processors 1002, coupled to a non-transitory computer readable storage medium 1020 via an input/output (I/O) interface 1010. The AMV management system 210 may also include a propeller motor controller 1004, power module 1006 and/or a navigation system 1008. The AMY management system 210 further includes an inventory engagement mechanism controller 1012, a network interface 1016, and one or more input/output devices 1018.

In various implementations, the AMV management system 210 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, navigation paths, software programs for authenticating AMVs and communicating with the AMV management system, and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024 and navigation path data 1026, respectively. In some implementations, the software program added to a user's AMV may be stored on the computer readable storage medium 1020. In other implementations, program instructions, data and/or navigation paths may be received, sent or stored upon different types of computer-accessible media, such as non-transitory media, or on similar media separate from the non-transitory computer readable storage medium 1020 or the AMV management system 210. Generally speaking, a non-transitory, computer readable storage medium may include storage media or memory media such as magnetic or optical media, e.g., disk or CD/DVD-ROM, coupled to the AMV management system 210 via the I/O interface 1010. Program instructions and data stored via a non-transitory computer readable storage medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface 1010 or other peripheral interfaces, such as input/output devices 1018. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propeller motor(s) controller 1004 communicates with the navigation system 1008 and adjusts the power of each propeller motor to guide the AMV along a determined navigation path to a delivery location. The navigation system 1008 may include a GPS or other similar system than can be used to navigate the AMV to and/or from a delivery location, relay location, user designated location, or materials handling facility. The inventory engagement mechanism controller 1012 communicates with the motor(s) (e.g., a servo motor) used to engage and/or disengage inventory. For example, when the AMV is positioned over a level surface at a delivery location, the inventory engagement mechanism controller 1012 may provide an instruction to a motor that controls the inventory engagement mechanism to release the inventory.

The network interface 1016 may be configured to allow data to be exchanged between the AMV management system 210, other devices attached to a network, such as other computer systems, and/or with AMV management systems of other AMVs. For example, the network interface 1016 may enable wireless communication between numerous AMVs that are transporting inventory to various delivery destinations. In various implementations, the network interface 1016 may support communication via wireless general data networks, such as a Wi-Fi network. For example, the network interface 1016 may support communication via telecommunications networks such as cellular communication networks, satellite networks, and the like.

Input/output devices 1018 may, in some implementations, include one or more displays, image capture devices, thermal sensors, infrared sensors, time of flight sensors, accelerometers, pressure sensors, or weather sensors. Multiple input/output devices 1018 may be present and controlled by the AMY management system 210. One or more of these sensors may be utilized to assist in the landing as well as avoid obstacles during delivery and/or engagement of inventory. For example, utilizing a location signal from the GPS receiver and one or more IR sensors, the AMV may safely land on a location designated by the user. The IR sensors may be used to provide real-time data to assist the AMV in avoiding moving/movable obstacles.

As shown in FIG. 10, the memory 1020 may include program instructions 1022 which may be configured to implement the example processes and/or sub-processes described above. The data storage 1024 may include various data stores for maintaining data items that may be provided for determining navigation paths, retrieving inventory, landing, or identifying a level surface for disengaging inventory.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AMV management system 210 is merely illustrative and is not intended to limit the scope of the present disclosure. In particular, the computing system and devices may include any combination of hardware or software that can perform the indicated functions, including computers, network devices, internet appliances, PDAs, wireless phones, or pagers. The AMV management system 210 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AMV management system. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AMV management system 210 may be transmitted to AMV management system 210 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other AMV management system configurations.

FIG. 11 is a pictorial diagram of an illustrative implementation of a server system, such as the server system 420, that may be used in the implementations described herein. The server system 420 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display (not shown in FIG. 11) permitting an operator of the server system 420 to monitor and configure operation of the server system 420. The input/output interface 1106 likewise communicates with external input/output devices not shown in FIG. 11, such as a mouse, keyboard, scanner, or other input and output devices that can be operated by an operator of the server system 420. The network interface 1108 includes hardware, software, or any combination thereof, to communicate with other computing devices. For example, the network interface 1108 may be configured to provide communications between the server system 420 and other computing devices, such as an AMV, materials handling facility, relay location and/or a delivery location, as shown in FIG. 4.

The memory 1112 generally comprises random access memory (RAM), read-only memory (ROM), flash memory, and/or other volatile or permanent memory. The memory 1112 is shown storing an operating system 1114 for controlling the operation of the server system 420. A binary input/output system (BIOS) 1116 for controlling the low-level operation of the server system 420 is also stored in the memory 1112.

The memory 1112 additionally stores program code and data for providing network services to the AMY management system 426. Accordingly, the memory 1112 may store a browser application 1118. The browser application 1118 comprises computer executable instructions that, when executed by the processor 1100, generate or otherwise obtain configurable markup documents such as Web pages. The browser application 1118 communicates with a data store manager application 1120 to facilitate data exchange between the inventory data store 1124, the user data store 1122, and/or verified AMV data store 1126, and/or other data stores.

As used herein, the term "data store" refers to any device or combination of devices capable of storing, accessing and retrieving data, which may include any combination and number of data servers, databases, data storage devices and data storage media, in any standard, distributed or clustered environment. The server system 420 can include any appropriate hardware and software for integrating with the data stores 1122-1126 as needed to execute aspects of one or more applications for the AMV management system, AMVs, materials handling facilities, secure delivery locations, and/or relay locations.

The data stores 1122-1126 can include several separate data tables, databases or other data storage mechanisms and media for storing data relating to a particular aspect. For example, the data stores 1122-1126 illustrated include mechanisms for inventory information, container information, AMV information, user information, weather information, route information, source location information, or delivery location information, which can be used to generate and deliver information to the AMV management system 426, materials handling facilities, secure delivery locations, AMVs, relay locations, and/or users.

It should be understood that there can be many other aspects that may be stored in the data stores 1122-1126. The data stores 1122-1126 are operable, through logic associated therewith, to receive instructions from the server system 420 and obtain, update or otherwise process data in response thereto.

The memory 1112 may also include the AMV management system 426, discussed above. The AMV management system 426 may be executable by the processor 1100 to implement one or more of the functions of the server system 420. In one implementation, the AMV management system 426 may represent instructions embodied in one or more software programs stored in the memory 1112. In another implementation, the AMV management system 426 can represent hardware, software instructions, or a combination thereof.

The server system 420, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, or modified, in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method for delivering an ordered item to a user, comprising:
   receiving from a user device an order for an item;
   determining an automated mobile vehicle associated with a user that submitted the order for the item, wherein the automated mobile vehicle is owned or controlled by the user and located at a user designated location prior to the order for the item;
   associating the automated mobile vehicle with the order for the item;
   controlling, by the user, a navigation of the automated mobile vehicle to a materials handling facility that contains the ordered item;
   determining that the automated mobile vehicle has arrived at a transition area surrounding the materials handling facility;
   sending, by an automated mobile vehicle management system, an instruction to cause the automated mobile vehicle to remain in the transition area until the automated mobile vehicle has been verified;
   verifying the automated mobile vehicle;
   in response to verification of the automated mobile vehicle,
      transferring control of the automated mobile vehicle from the user to the automated mobile vehicle management system;
      controlling, by the automated mobile vehicle management system, a navigation of the automated mobile vehicle in a controlled area around the materials handling facility; and
      causing the automated mobile vehicle to retrieve the item from a retrieval location within the materials handling facility; and
   transferring control of the automated mobile vehicle from the automated mobile vehicle management system to the user outside the controlled area around the materials handling facility; and
   controlling, by the user, a navigation of the automated mobile vehicle to a user specified location.

2. The method of claim 1, wherein verifying the automated mobile vehicle includes comparing one or more automated mobile vehicle characteristics obtained from the automated mobile vehicle while located in the transition area with stored automated mobile vehicle characteristics.

3. The method of claim 1, further comprising:
determining that the automated mobile vehicle is provisionally approved for entry into the controlled area around the materials handling facility;
establishing one or more automated mobile vehicle characteristics representative of the automated mobile vehicle;
determining that the automated mobile vehicle satisfies a minimum criterion; and
approving the automated mobile vehicle.

4. The method of claim 1, wherein the user specified location is a location at which the item is to be delivered.

5. The method of claim 1, further comprising:
subsequent to verifying the automated mobile vehicle, determining that the automated mobile vehicle is to receive a service before the automated mobile vehicle departs the materials handling facility; and
causing the service to be provided to the automated mobile vehicle.

6. The method of claim 5, wherein the service is at least one of recharging a power module of the automated mobile vehicle, replacing a power module of the automated mobile vehicle, repairing the automated mobile vehicle, updating a software of the automated mobile vehicle, or updating a firmware of the automated mobile vehicle.

7. The method of claim 1, further comprising:
receiving, by the automated mobile vehicle management system, a request for permission for the automated mobile vehicle to enter the transition area.

8. A computer-implemented method, comprising:
under control of one or more computing systems configured with executable instructions,
determining an automated mobile vehicle associated with a user, wherein the automated mobile vehicle is owned or controlled by the user and located at a user designated location prior to an order for an item;
associating the automated mobile vehicle with the order for the item;
controlling, by the user, a navigation of the automated mobile vehicle to a materials handling facility that contains the item;
sending, by an automated mobile vehicle management system, an instruction to cause the automated mobile vehicle to remain in a transition area until the automated mobile vehicle has been verified;
in response to verification of the automated mobile vehicle, transferring control, from the user to the automated mobile vehicle management system, of the automated mobile vehicle within a controlled area around the materials handling facility;
controlling, by the automated mobile vehicle management system, a navigation of the automated mobile vehicle while the automated mobile vehicle is in the controlled area around the materials handling facility;
causing the automated mobile vehicle to retrieve the item from a retrieval location within the materials handling facility;
transferring control, from the automated mobile vehicle management system to the user, of the automated mobile vehicle outside the controlled area around the materials handling facility; and
controlling, by the user, a navigation of the automated mobile vehicle with the item to a user specified location.

9. The computer-implemented method of claim 8, further comprising:
prior to causing the automated mobile vehicle to retrieve the item:
determining that the automated mobile vehicle has arrived at the transition area surrounding the materials handling facility; and
verifying the automated mobile vehicle.

10. The computer-implemented method of claim 9, wherein verifying the automated mobile vehicle includes comparing one or more automated mobile vehicle characteristics obtained from the automated mobile vehicle while located in the transition area with stored automated mobile vehicle characteristics.

11. The computer-implemented method of claim 8, further comprising:
determining that the automated mobile vehicle has arrived at the transition area surrounding the materials handling facility.

12. The computer-implemented method of claim 8, further comprising:
determining that the automated mobile vehicle is provisionally approved for entry into the controlled area around the materials handling facility;
determining one or more automated mobile vehicle characteristics representative of the automated mobile vehicle;
determining that the automated mobile vehicle satisfies a minimum criterion; and
approving the automated mobile vehicle.

13. The computer-implemented method of claim 12, wherein the one or more automated mobile vehicle characteristics include one or more of a model number of the automated mobile vehicle, a serial number of the automated mobile vehicle, a navigation capability of the automated mobile vehicle, an available power of a power module of the automated mobile vehicle, a power module size, a motor type, a motor size, a propeller size, a number of motors, whether the automated mobile vehicle has a fire suppression system, an ability for the automated mobile vehicle to be controlled by the automated mobile vehicle management system, a weight of the automated mobile vehicle, a lift capacity of the automated mobile vehicle, an override control capability of the automated mobile vehicle, a communication capability, or an image of the automated mobile vehicle.

14. The computer-implemented method of claim 8, wherein the automated mobile vehicle is at least one of an aerial based automated mobile vehicle, a ground based automated mobile vehicle, or a water based automated mobile vehicle.

15. A computing system, comprising:
one or more processors;
a memory in communication with the one or more processors and storing program instructions that when executed by the one or more processors cause the one or more processors to at least:
determine an automated mobile vehicle, wherein the automated mobile vehicle is owned or controlled by a user and located at a user designated location prior to an order for an item;
associate the automated mobile vehicle with the order for the item;
control, by the user, a navigation of the automated mobile vehicle to a location of a materials handling facility that contains the item;
send, by an automated mobile vehicle management system, an instruction to cause the automated mobile vehicle to remain in a transition area until the automated mobile vehicle has been verified;
verify the automated mobile vehicle;
determine that the automated mobile vehicle has arrived at the materials handling facility;
in response to verification of the automated mobile vehicle and the determination that the automated mobile vehicle has arrived at the materials handling facility,
- transfer control, from the user to the automated mobile vehicle management system, of the automated mobile vehicle while the automated mobile vehicle is at the materials handling facility;
- control, by the automated mobile vehicle management system, a navigation of the automated mobile vehicle while the automated mobile vehicle is at the materials handling facility; and
- cause the automated mobile vehicle to retrieve the item from a retrieval location within the materials handling facility; and transfer control, from the automated mobile vehicle management system to the user, of the automated mobile vehicle upon departing the materials handling facility; and control, by the user, a navigation of the automated mobile vehicle with the item to a delivery location.

16. The computing system of claim 15, wherein the delivery location is a user specified location.

17. The computing system of claim 15, wherein the program instructions further cause the one or more processors to at least:
in response to the determination that the automated mobile vehicle has arrived at the materials handling facility, verify the automated mobile vehicle.

18. The computing system of claim 15, wherein the program instructions further cause the one or more processors to at least:
determine that the automated mobile vehicle is provisionally approved for entry into a controlled area around the materials handling facility;
establish one or more automated mobile vehicle characteristics representative of the automated mobile vehicle;
determine that the automated mobile vehicle satisfies a minimum criterion; and
approve the automated mobile vehicle.

* * * * *